US009438496B2

(12) United States Patent
Raman et al.

(10) Patent No.: US 9,438,496 B2
(45) Date of Patent: Sep. 6, 2016

(54) MONITORING LINK QUALITY BETWEEN NETWORK DEVICES

(71) Applicant: Aruba Networks, Inc., Sunnyvale, CA (US)

(72) Inventors: Gopalakrishna Raman, Santa Clara, CA (US); Kiranmaye Sirigineni, Sunnyvale, CA (US); Neal Castagnoli, Morgan Hill, CA (US); Rajini Balay, Fremont, CA (US); Scott McGrath, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 223 days.

(21) Appl. No.: 14/069,077

(22) Filed: Oct. 31, 2013

(65) Prior Publication Data
US 2015/0117234 A1 Apr. 30, 2015

(51) Int. Cl.
*H04L 12/26* (2006.01)

(52) U.S. Cl.
CPC ....... *H04L 43/0829* (2013.01); *H04L 43/0894* (2013.01); *H04L 43/10* (2013.01); *H04L 43/062* (2013.01)

(58) Field of Classification Search
CPC . H04L 41/5009; H04L 43/062; H04L 43/08; H04L 43/0811; H04L 43/0829; H04L 43/0894; H04L 43/10; H04L 45/123; H04L 45/26; H04L 45/30; H04L 47/10; H04L 47/11; H04L 47/115; H04W 24/02; H04W 36/30; H04W 40/12; H04W 52/265; H04W 52/267
See application file for complete search history.

(56) References Cited

U.S. PATENT DOCUMENTS

| 8,155,081 | B1* | 4/2012 | Mater et al. | 370/331 |
| 2003/0115321 | A1* | 6/2003 | Edmison | H04L 1/20 709/224 |
| 2006/0285500 | A1* | 12/2006 | Booth | H04L 41/5035 370/250 |
| 2008/0080390 | A1* | 4/2008 | Ebuchi | H04L 43/12 370/253 |
| 2009/0257361 | A1* | 10/2009 | Deshpande et al. | 370/252 |
| 2011/0038269 | A1* | 2/2011 | Bu | H04L 43/0835 370/252 |
| 2011/0310755 | A1* | 12/2011 | Schoeller et al. | 370/252 |
| 2012/0269086 | A1* | 10/2012 | Yue | H04L 1/203 370/252 |
| 2014/0036696 | A1* | 2/2014 | Lee et al. | 370/252 |

OTHER PUBLICATIONS

Xiao et al., Throughput Measurement for MPLS-based Transport Networks, draft-xhk-mpls-tp-throughput-03, IETF, Oct. 10, 2011.*

* cited by examiner

*Primary Examiner* — Benjamin H Elliott, IV
*Assistant Examiner* — Eric Nowlin
(74) *Attorney, Agent, or Firm* — Mannava & Kang, P.C.

(57) ABSTRACT

The present disclosure discloses a system and method for monitoring link quality between internetworking devices. The system includes a processor and a memory storing instructions that, when executed, cause the system to: generate, at a first internetworking device, a marker-request packet that includes a current marker ID; send, from the first internetworking device, the marker-request packet to a second internetworking device; receive, at the first internetworking device, a marker-reply packet that responds to the marker-request packet from the second internetworking device, the marker-reply packet including the current marker ID and a previous marker ID; and determine, at the first network device, a link quality between the first internetworking device and the second internetworking device based at least in part on the marker-reply packet.

18 Claims, 15 Drawing Sheets

MONITORING LINK QUALITY BETWEEN NETWORK DEVICES

FIELD

The present disclosure relates to monitoring network connectivity and performance. In particular, the present disclosure relates to a system and method for monitoring link quality between network devices.

BACKGROUND

Client devices may experience network problems such as low network performance and/or network downtimes when the client devices are connected to wireless networks. The network problems can be incurred by wireless links between the client devices and wireless equipments (e.g., access points). The network problems can also be incurred by wired links between wireless equipments and controllers. For example, if a wired link between an access point and a controller achieves its capacity limit, low network performance or network downtime may occur to client devices that connect to the access point. It may need a considerable amount of time to troubleshoot the network problems and find out whether the problems are caused by the wired links or the wireless links.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1:
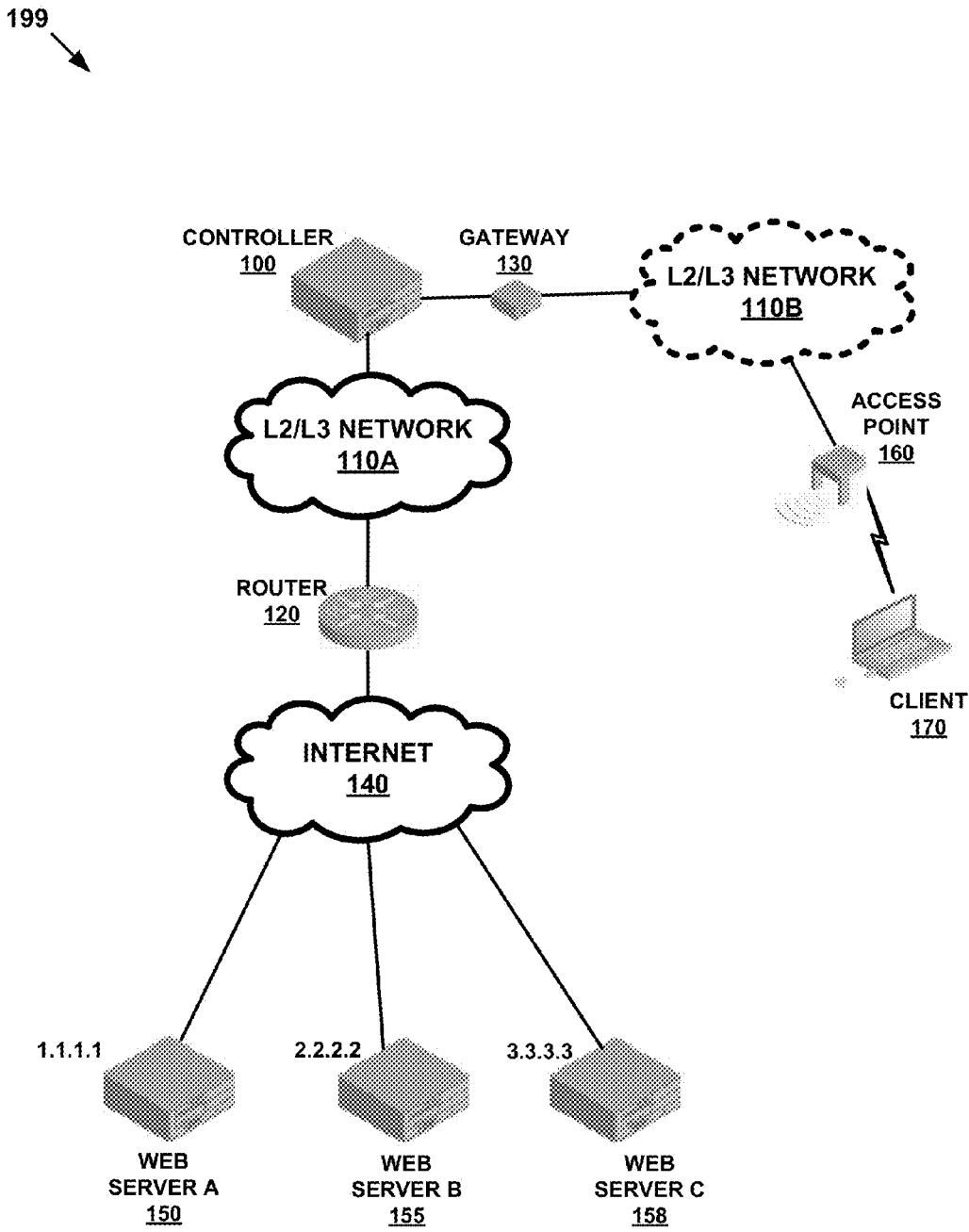
FIG. 1 is a block diagram illustrating an exemplary network environment according to embodiments of the present disclosure.

In the following description, several specific details are presented to provide a thorough understanding. While the context of the disclosure is directed to monitoring link quality between network devices, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to monitoring network connectivity and performance. In particular, the present disclosure relates to a system and method for monitoring a link quality between network devices. Specifically, the system provides an efficient mechanism to troubleshoot problems in network connectivity and performance. The system proactively monitors a link quality between network devices and provides an alert message to an administrator if the link quality is below a threshold. This proactive network monitoring mechanism can provide the administrator with near real-time network performance information, and facilitate the administrator to identify potential network problems and to prevent occurrence of the network problems. If network problems occur, the network monitoring mechanism can also provide information about the link quality to the administrator, helping the administrator to troubleshoot the problems.

According to embodiments of the present disclosure, an access point generates a marker-request packet and sends the marker-request packet to a controller periodically. Each marker-request packet includes a current marker identifier (ID). Correspondingly, the controller generates a marker-reply packet that responds to the marker-request packet, and sends the marker-reply packet to the access point. The access point determines a link quality between the access point and the controller based at least in part on the marker-reply packet. If the link quality is below a threshold, the access point may raise a red flag for the link quality. The access point can also determine a packet round trip time between the access point and the controller.

In some embodiments, the marker-reply packet includes the current marker ID, a previous marker ID stored on the controller, a controller's TX count and a controller's RX count for the access point. The controller's TX count records the number of packets sent by the controller to the access point between the previous marker ID and the current marker ID. The controller's RX count records the number of packets received at the controller from the access point between the previous marker ID and the current marker ID.

In some embodiments, the access point determines the link quality by: (1) determining an access point's TX count and an access point's RX count, where the access point's TX count records the number of packets sent by the access point to the controller between the previous marker ID and the current marker ID, and the access point's RX count records the number of packets received at the access point from the controller between the previous marker ID and the current marker ID; (2) determining, from the marker-reply packet, the controller's TX count and the controller's RX count between the previous marker ID and the current marker ID; (3) determining a first packet loss in a direction from the access point to the controller based on a difference between the access point's TX count and the controller's RX count; (4) determining a second packet loss in a direction from the controller to the access point based on a difference between the controller's TX count and the access point's RX count; and (5) determining the link quality based on the first packet loss and the second packet loss.

The inclusion of a previous marker ID and a current marker ID in the marker-reply packet is beneficial, because the previous marker ID and the current marker ID in the marker-reply packet can be used as reference points to determine a time interval during which the access point's TX count and RX count are related to. For example, after one or more previous marker-request packets and/or previous marker-reply packets are lost on the way, the access point sends a marker-request packet to the controller and receives a marker-reply packet corresponding to the marker-request packet. The access point can obtain the current marker ID and the previous marker ID from the marker-reply packet, and determine the link quality between the previous marker ID and the current marker ID that are specified in the marker-reply packet. The monitoring of the link quality is not interrupted by the loss of the marker-request packets and/or marker-reply packets.

In some embodiments, the controller is connected to a plurality of access points. It is beneficial to perform operations at an access point for the determination of a link quality between the controller and the respective access point, so that the computation workload can be distributed across the plurality of access points. Each access point may generate a report describing the corresponding link quality and sends the report to the controller or a monitoring system, causing the controller or the monitoring system to provide the report to an administrator via a user interface.

It is useful to monitor link quality of a wired link between an access point and a controller for a variety of networks such as an enterprise network or a university network as well as for remote access points. In particular, monitoring the link quality is especially useful for access points having wireless IEEE 802.11ac interface that is capable of achieving data traffic of 1 Gigabit per second.

Computing Environment

FIG. 1 shows an exemplary digital network environment 199 according to embodiments of the present disclosure. FIG. 1 includes at least one or more network controller (such as controller 100), one or more access points (such as access point 160), one or more client devices (such as client 170), a layer 2 or layer 3 network 110, a routing device (such as router 120), a gateway 130, Internet 140, and one or more web servers (such as web server A 150, web server B 155, and web server C 158), etc. The components of the digital network environment 199 are communicatively coupled to each other. In some embodiments, the digital network environment 199 may include other components not shown in FIG. 1 such as an email server, a cloud-based storage device, etc.

The controller 100 is a hardware device and/or software module that provide network managements, which include but are not limited to, controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, route analytics and accounting management, etc.

Moreover, assuming that a number of access points, such as access point 160, are interconnected with the network controller 100. Each access point 160 may be interconnected with zero or more client devices via either a wired interface or a wireless interface. In this example, for illustration purposes only, assuming that the client 170 is associated with the access point 160 via a wireless link. An access point 160 generally refers to a network device that allows wireless clients to connect to a wired network. Access points 160 usually connect to a controller 100 via a wired network or can be a part of a controller 100 in itself. For example, the access point 160 is connected to the controller 100 via an optional L2/L3 network 110B.

Furthermore, the controller 100 can be connected to the router 120 through zero or more hops in a layer 3 or layer 2 network (such as L2/L3 Network 110A). The router 120 can forward traffic to and receive traffic from the Internet 140. The router 120 generally is a network device that forwards data packets between different networks, and thus creating an overlay internetwork. A router 120 is typically connected to two or more data lines from different networks. When a data packet comes in one of the data lines, the router 120 reads the address information in the packet to determine its destination. Then, using information in its routing table or routing policy, the router 120 directs the packet to the next/different network. A data packet is typically forwarded from one router 120 to another router 120 through the Internet 140 until the packet gets to its destination.

The gateway 130 is a network device that passes network traffic from local subnet to devices on other subnets. In some embodiments, the gateway 130 may be connected to a controller 100 or be a part of the controller 100 depending on the configuration of the controller 100.

Web servers 150, 155, and 158 are hardware devices and/or software modules that facilitate delivery of web content that can be accessed through the Internet 140. For example, the web server A 150 may be assigned an IP address of 1.1.1.1 and used to host a first Internet website (e.g., www.yahoo.com); the web server B 155 may be assigned an IP address of 2.2.2.2 and used to host a second Internet website (e.g., www.google.com); and, the web server C 158 may be assigned an IP address of 3.3.3.3 and used to host a third Internet website (e.g., www.facebook.com).

The client 170 may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network. Although only one client 170 is illustrated in FIG. 1, a plurality of clients 170 can be included in FIG. 1.

First Network Device for Monitoring Link Quality

Figure 2A:
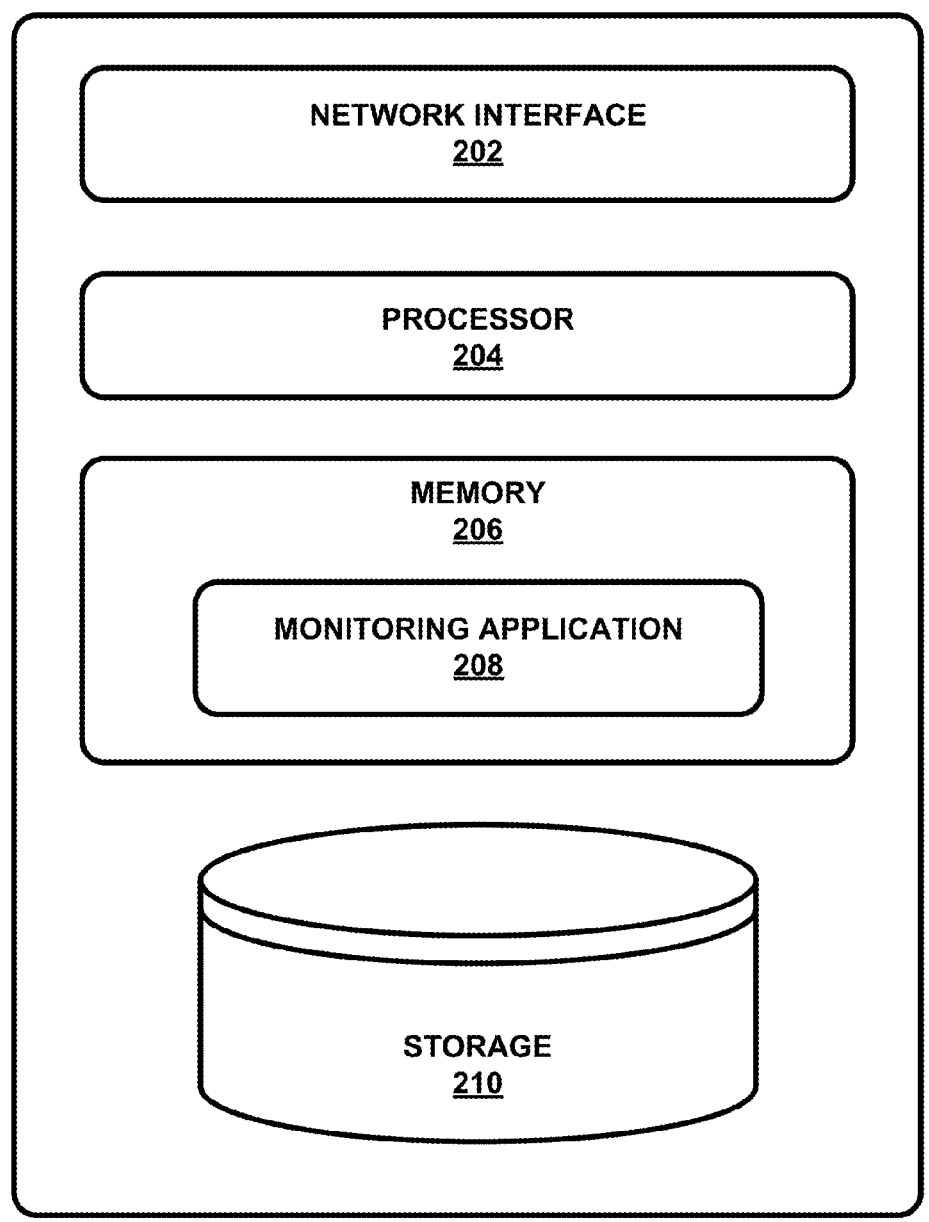
FIG. 2A is a block diagram illustrating an exemplary network device according to embodiments of the present disclosure.

FIG. 2A is a block diagram illustrating an example network device system for monitoring link quality according to embodiments of the present disclosure. In some embodiments, the example network device is an access point 160. It should be understood that, in other embodiments, the network device may be one of a network switch, a network router, a network controller, a network gateway, a network server, etc. Further, the network device may serve as a node in a distributed or a cloud computing environment. According to embodiments of the present disclosure, network services provided by a network device, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

In some embodiments, the access point 160 includes a network interface 202 capable of communicating to a wired network, a processor 204, a memory 206 and a storage device 210. The components of the access point 160 are communicatively coupled to each other.

The network interface 202 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, the network interface 202 may be software-defined and programmable, for example, via an Application Programming Interface (API), and thus allowing for remote control of the network device.

The processor 204 includes an arithmetic logic unit, a microprocessor, a general purpose controller or some other processor array to perform computations and provide electronic display signals to a display device. Processor 204 processes data signals and may include various computing architectures including a complex instruction set computer (CISC) architecture, a reduced instruction set computer (RISC) architecture, or an architecture implementing a combination of instruction sets. Although FIG. 2 includes a single processor 204, multiple processors 204 may be included. Other processors, operating systems, sensors, displays and physical configurations are possible. In some embodiments, the processor 204 includes a networking processor core that is capable of processing network data traffic.

The memory 206 stores instructions and/or data that may be executed by the processor 204. The instructions and/or data may include code for performing the techniques described herein. The memory 206 may be a dynamic random access memory (DRAM) device, a static random access memory (SRAM) device, flash memory or some other memory device. In some embodiments, the memory 206 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 206 stores a monitoring application 208. The monitoring application 208 can be code and routines for monitoring a link quality on an access point side. In some embodiments, the monitoring application 208 can be implemented using hardware including a field-programmable gate array (FPGA) or an application-specific integrated circuit (ASIC). In some other embodiments, the monitoring application 208 can be implemented using a combination of hardware and software. In some embodiments, the monitoring application 208 may be stored in a combination of the network devices, or in one of the network devices. The monitoring application 208 is described below in more detail with reference to FIGS. 2B and 4-6C.

The storage device 210 can be a non-transitory memory that stores data for providing the functionality described herein. The storage device 210 may be a dynamic random access memory (DRAM) device, a static random access memory (SRAM) device, flash memory or some other memory devices. In some embodiments, the storage device 210 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Monitoring Application

Figure 2B:
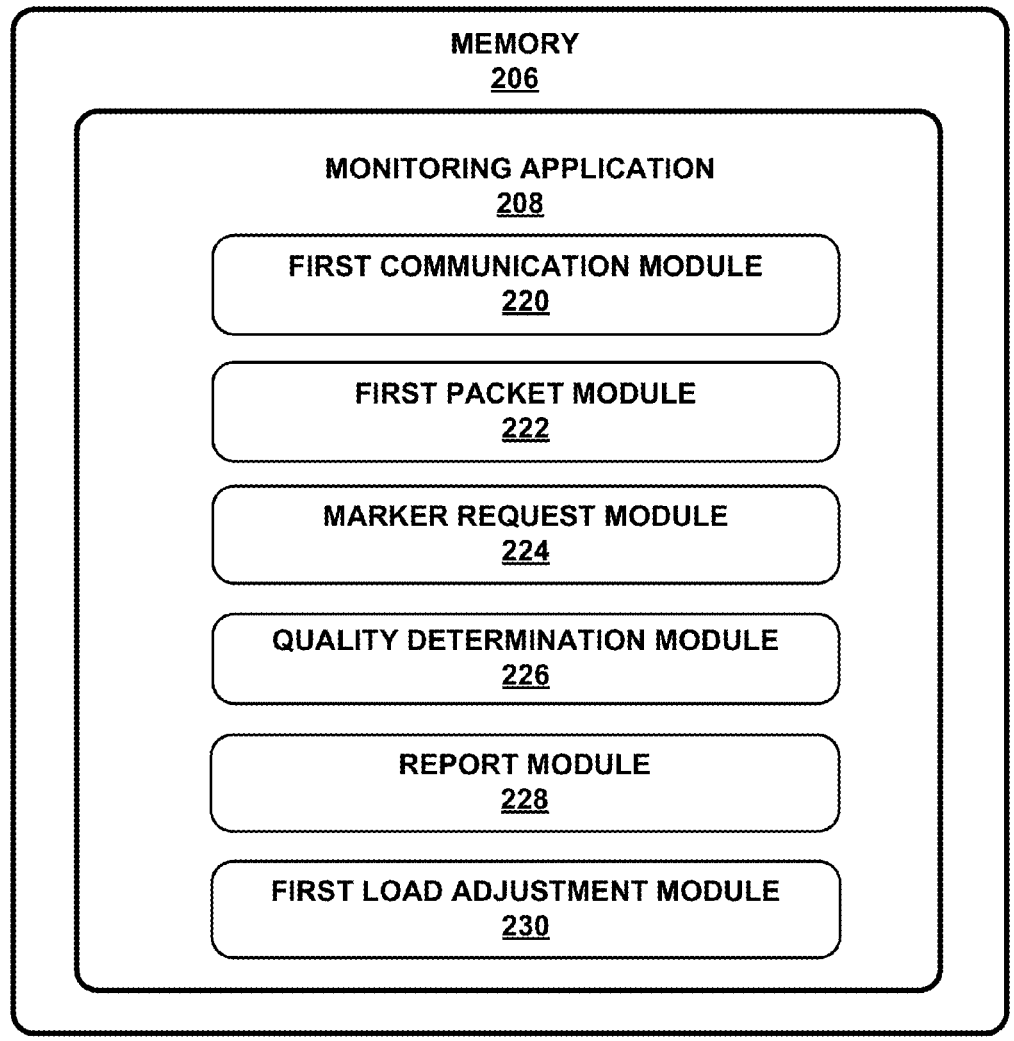
FIG. 2B is a block diagram illustrating an exemplary monitoring application stored on a memory according to embodiments of the present disclosure.

FIG. 2B illustrates an exemplary monitoring application 208 stored on a memory 206 according to embodiments of the present disclosure. In some embodiments, the monitoring application 208 includes a first communication module 220, a first packet module 222, a maker request module 224, a quality determination module 226, a report module 228 and a first load adjustment module 230. The components of the monitoring application 208 are communicatively coupled to each other. In some embodiments, each module of the monitoring application 208 can be a set of instructions executable by the processor 204 to provide the functionality described herein. In some other embodiments, each module of the monitoring application 208 can be stored in the memory 206 of the access point 160 and can be accessible and executable by the processor 204. Each module of the monitoring application 208 may be adapted for cooperation and communication with the processor 204 and other components of the access point 160 such as the network interface 202, the storage 210, etc.

The first communication module 220 can be software including routines for handling communications between the monitoring application 208 and other components in the digital computing environment 199. In some embodiments, the first communication module 220 sends and receives data to and from one or more of a client 170, a controller 100 and other network devices via the network interface 202. For example, the first communication module 220 receives packets from a controller 100 via the network interface 202, and forwards the received packets to the first packet module 222. In another example, the first communication module 220 receives data describing a report from the report module 228 and sends the report to the controller 100 via the network interface 202. In some embodiments, the first communication module 220 handles communications between components of the monitoring application 208.

In some embodiments, the first communication module 220 receives data from components of the monitoring application 208 and stores the data in the storage device 210. For example, the first communication module 220 receives data describing a TX count and a RX count from the first packet module 222, and stores the TX count and RX count in the storage device 210. The TX count and RX count are described below in more detail. In some embodiments, the first communication module 220 retrieves data from the storage device 210, and sends the data to components of the monitoring application 208. For example, the first communication module 220 retrieves data describing a TX count and RX count from the storage device 210, and sends the TX count and RX count to the quality determination module 226.

The first packet module 222 can be software including routines for managing packets exchanged between the access point 160 and another network device such as a controller 100. In some embodiments, the first packet module 222 manages a transmitting (TX) counter at the access point 160, where the TX counter counts the number of packets sent from the access point 160 to the controller 100.

The count value stored in the TX counter is referred to as a transmitting (TX) count. In some embodiments, the TX count is equal to the number of packets sent from the access point 160 to the controller 100. In some embodiments, the data sent from the access point 160 to the controller 100 is organized into buckets of packet length so that each bucket has a size of the packet length. The TX count is equal to the number of buckets. For example, assume a packet length is 200 Bytes. If the first packet module 222 already sends a total of 2050 Bytes of data to the controller 100, the 2050 Bytes of data is organized into 11 buckets and the TX count at the access point 160 has a value of 11.

In some embodiments, each TX count is associated with a marker identifier (ID). A marker ID is an identifier that identifies a marker-request packet. For example, a marker ID is a unique sequence number included in the marker-request packet. The marker-request packet is described below in more detail. A TX count associated with a marker ID indicates the total number of packets that the access point 160 has sent to the controller 100 at the time when the marker-request packet identified by the marker ID is sent from the access point 160 to the controller 100. For example, a TX count having a value of 281 and associated with a marker ID=100 indicates the access point 160 has already sent 281 packets to the controller 100 at the time when a marker-request packet having the marker ID=100 is generated and sent to the controller 100. In some embodiments, the marker-request packet is also considered as part of the data packets counted by the TX count.

In some embodiments, the first packet module 222 manages a receiving (RX) counter at the access point 160, where the TX counter counts the number of packets received at the access point 160 from the controller 100. The count value stored in the RX counter is referred to as a RX count. In some embodiments, the RX count is equal to the number of packets received at the access point 160 from the controller 100. In some embodiments, the data received at the access point 160 from the controller 100 is organized into buckets of packet length so that each bucket has a size of the packet length. The RX count is equal to the number of buckets. For example, assume a packet length is 200 Bytes. If the first packet module 222 already receives a total of 2050 Bytes of data from the controller 100, the 2050 Bytes of data is organized into 11 buckets and the RX count has a value of 11. Organizing the TX count and RX count into buckets of packet length is beneficial because it can help to figure out if only large packets are getting lost due to fragmentation.

In some embodiments, each RX count is associated with a marker ID. A RX count associated with a marker ID indicates the total number of packets that the access point 160 has received from the controller 100 at the time when the marker-request packet identified by the marker ID is sent from the access point 160 to the controller 100. For example, a RX count having a value of 281 and associated with a marker ID=100 indicates the access point 160 has already received 281 packets from the controller 100 at the time when a marker-request packet having the marker ID=100 is generated and sent to the controller 100. In some embodiments, the data packets counted by the RX counter also include marker-reply packets received from the controller 100. The marker-reply packets are described below in more detail.

The first packet module 222 stores the TX count in the TX counter and the RX count in the RX counter. When the first packet module 222 receives additional packets at the access point 160 from the controller 100, the first packet module 222 updates the RX count in the RX counter to account for the additional packets. For example, the first packet module 222 increases the RX count by a number of the additional packets. When the first packet module 222 sends additional packets from the access point 160 to the controller 100, the first packet module 222 updates the TX count in the TX counter at the access point 160 to account for the additional packets. For example, the first packet module 222 increases the TX count by a number of the additional packets. Before exchanging packets between the access point 160 and the controller 100, the first packet module 222 may initialize the TX count and the RX count at the access point 160 to be zero.

In some embodiments, the first packet module 222 stores multiple TX counts and RX counts associated with multiple previous marker IDs to facilitate the determination of link quality. For example, the first packet module 222 stores TX counts and RX counts associated with multiple previous marker IDs in addition to the TX count and RX count associated with the current marker ID. For example, if the current marker ID is marker ID=50, the first packet module 222 stores: (1) a first TX count and RX count associated with the previous marker ID=47; (2) a second TX count and RX count associated with the previous marker ID=48; (3) a third TX count and RX count associated with the previous marker ID=49; and (4) a fourth TX count and RX count associated with the current marker ID=50. Storing multiple TX counts and RX counts associated with previous marker IDs on the access point 160 is beneficial, because the monitoring of link quality is not interrupted by loss of marker-request packets and/or marker-reply packets. An example process to deal with loss of marker-request packets and/or marker-reply packets is described below with reference to FIGS. 8A-8D.

In some embodiments, the first packet module 222 stores a list of TX counts and RX counts since receiving the last marker-reply packet from the controller 100, so that the access point's TX packets and RX packets between each two consecutive marker-request packets since receiving the last marker-reply packet are recorded by one TX count and RX count respectively. For example, assume the last marker-reply packet is a marker-reply packet replying to the marker-request packet with marker ID=200. The first packet module 222 continues to generate and send a next marker-request packet with marker ID=201 to the controller 100. If the first packet module 222 receives a marker-reply packet responding to the marker-request packet with marker ID=201, then the first packet module 222 stores (1) a TX count counting the access point's TX packets between marker ID=200 and marker ID=201 and (2) a RX count counting the access point's RX packets between marker ID=200 and marker ID=201.

However, if the first packet module 222 only receives a marker-reply packet responding to the marker-request packet with marker ID=206 without receiving marker-reply packets responding to the marker-request packets with marker IDs from 201 to 205, the first packet module 222 stores a list of TX counts and RX counts since marker ID=200. For example, the first packet module 222 stores: (1) a first TX count and RX count between marker ID=200 and marker ID=201; (2) a second TX count and RX count between marker ID=201 and marker ID=202; (3) a third TX count and RX count between marker ID=202 and marker ID=203; (4) a fourth TX count and RX count between marker ID=203 and marker ID=204; (5) a fifth TX count and RX count between marker ID=204 and marker ID=205; and (6) a sixth TX count and RX count between marker ID=205 and marker ID=206.

In some examples, the controller 100 receives the access point's marker-request packets with marker IDs from 201 and 205, and sends marker-reply packets responding to the marker-request packets with marker IDs from 201 and 205 to the access point 160 respectively. The first packet module 222 at the access point 160 does not receive the marker-reply packets because they are lost on the way from the controller 100 to the access point 160 (referred to as loss of marker-reply packets). Next, the first packet module 222 receives a marker-reply packet responding to the marker-request packet with marker ID=206, where the marker-reply packet includes a previous marker ID=205, a current marker ID=206, the controller's TX count and RX count between marker ID=205 and marker ID=206. The quality determination module 226 discards all the access point's TX counts and RX counts since marker ID=200 except the TX count and RX count between marker ID=205 and marker ID=206. The quality determination module 226 determines the link quality between marker ID=205 and marker ID=206 by performing operations similar to those described below.

In some other examples, the first packet module 222 at the access point 160 does not receive the marker-reply packets that reply to the marker-request packets with marker IDs from 201 to 205, because these marker-request packets are lost on the way from the access point 160 to the controller 100 respectively (referred to as loss of marker-request packets). Next, the first packet module 222 sends a marker-request packet with marker ID=206 to the controller 100, and receives a marker-reply packet responding to the marker-request packet with marker ID=206 from the controller 100. The marker-reply packet includes a previous marker ID=200, a current marker ID=206, the controller's TX count and RX count between marker ID=200 and marker ID=206. The quality determination module 226 determines the TX count between marker ID=200 and marker ID=206 by adding together: (1) the first TX count between marker ID=200 marker ID=201; (2) the second TX count between marker ID=201 and marker ID=202; (3) the third TX count between marker ID=202 and marker ID=203; (4) the fourth TX count between marker ID=203 and marker ID=204; (5) the fifth TX count between marker ID=204 and marker ID=205; and (6) the sixth TX count between marker ID=205 and marker ID=206. Similarly, the quality determination module 226 determines the RX count between marker ID=200 and marker ID=206 by adding the corresponding RX counts together. The quality determination module 226 then determines the link quality between marker ID=200 and marker ID=206 by performing operations similar to those described below.

The marker request module 224 can be software including routines for generating marker-request packets. A marker-request packet can be a packet of data for requesting the controller 100 to send a marker-reply packet to the access point 160. For example, the marker request module 224 at the access point 160 sends a marker-request packet to the controller 100, causing a marker reply module 324 stored on the controller 100 to generate and send a marker-reply packet back to the marker request module 224. Each marker-request packet includes a marker ID (e.g., a sequence number) identifying the marker-request packet.

A marker-reply packet can be a packet of data responding to a marker-request packet identified by a marker ID. In some embodiments, a marker-reply packet includes: (1) a current marker ID identifying a current marker-request packet that the marker-reply packet responds to; (2) a previous marker ID identifying a last marker-request packet that the controller 100 has received from the access point 160; (3) a controller's TX count between the previous marker ID and the current marker ID; and (4) a controller's RX count between the previous marker ID and the current marker ID.

The controller's TX count between the pervious marker ID and the current marker ID describes the number of packets that the controller 100 has sent to the access point 160 during a time period between (1) the time when the last marker-request packet identified by the previous marker ID is received at the controller 100 and (2) the time when the current marker-request packet identified by the current marker ID is received at the controller 100, and the controller's RX count between the previous marker ID and the current marker ID describes the number of packets that the controller 100 has received from the access point 160 during the same time period. For example, the controller's TX count between the previous marker ID and the current marker ID is equal to the controller's TX count associated with the current marker ID minus the controller's TX count associated with the previous marker ID. The controller's RX count between the previous marker ID and the current marker ID is equal to the controller's RX count associated with the current marker ID minus the controller's RX count associated with the previous marker ID.

In some embodiments, before any data packets and marker-request packets are sent from the access point 160 to the controller 100, the marker request module 224 initializes a marker ID to be an initial value (e.g., marker ID=0). Afterwards, the marker request module 224 generates and sends a marker-request packet to the controller 100 periodically. In some examples, the marker request module 224 updates the current marker ID and sends a marker-request packet including the current marker ID to the controller 100 in every second. For example, at a first second, the marker request module 224 updates the current marker ID to be 1 and sends a marker-request including marker ID=1 to the controller 100; at the next second, the marker ID=1 becomes a previous marker ID, and the marker request module 224 updates the current marker ID to be 2 and sends the marker-request packet including marker ID=2 to the controller 100, so on and so forth. The time interval between the generation and transmission of two consecutive marker-request packets is configured to be small enough to catch loss of bursty traffic. In some embodiments, a periodic heartbeat packet sent from the access point 160 to the controller 100 can be reused as a marker-request packet.

In some embodiments, the marker-request packet and the marker-reply packet are part of the traffic between the access point 160 and the controller 100, and are counted in the TX count and RX count respectively. If there is no other packet traffic between the access point 160 and the controller 100, the marker-request packet and the marker-reply packet can serve as ping packets for the computation of round-trip delay time (RTT) and also for the packet loss computation described herein.

The quality determination module 226 can be software including routines for determining a link quality of a wired link between the access point 160 and the controller 100. In some examples, the wired link is a bidirectional link. In some embodiments, the quality determination module 226 receives a marker-reply packet from the controller 100 via the first communication module 220. The marker-reply packet includes: (1) a current marker ID identifying a current marker-request packet that the marker-reply packet replies to; (2) a previous marker ID identifying a last marker-request packet that the controller 100 received from the access point 160; (3) a controller's TX count between the previous marker ID and the current marker ID; and (4) a controller's RX count between the previous marker ID and the current marker ID.

It is beneficial to include a previous marker ID in each marker-reply packet. For example, even if one or more marker-request packets and/or marker-reply packets are lost, the quality determination module 226 can perform operations similar to those described herein to determine a link quality. The loss of the marker-request packets and/or marker-reply packets does not interrupt the monitoring of the link quality.

The quality determination module 226 determines the access point's TX count and RX count between the previous marker ID and the current marker ID. The access point's TX count between the pervious marker ID and the current marker ID describes the number of packets that the access point 160 has sent to the controller 100 during a time period between (1) the time when the last marker-request packet identified by the previous marker ID is generated and sent to the controller 100 and (2) the time when the current marker-request packet identified by the current marker ID is generated and sent to the controller 100, and the access point's RX count between the previous marker ID and the current marker ID describes the number of packets that the access point 160 has received from the controller 100 during the same time period. For example, the access point's TX count between the previous marker ID and the current marker ID is equal to the access point's TX count associated with the current marker ID minus the access point's TX count associated with the previous marker ID. The access point's RX count between the previous marker ID and the current marker ID is equal to the access point's RX count associated with the current marker ID minus the access point's RX count associated with the previous marker ID.

For example, assume the previous marker ID is marker ID=1 and the current marker ID is marker ID=2. If the access point's TX count at marker ID=1 and marker ID=2 is 1234 and 1345 respectively, the access point's TX count between marker ID=1 and marker ID=2 is 111 (1345−1234=111). If the access point's RX count at marker ID=1 and marker ID=2 is 1200 and 1300 respectively, the access point's RX count between marker ID=1 and marker ID=2 is 100 (1300−1200=100).

The quality determination module 226 determines a first difference between the controller's TX count and the access point's RX count, and determines a first packet loss in a first direction from the controller 100 to the access point 160 based on the first difference. For example, the quality module 226 determines the first packet loss to be an absolute value of the first difference which represents the number of lost packets. In another example, the quality determination module 226 determines the first packet loss as a ratio between (1) the first difference (e.g., representing the number of lost packets) and (2) the controller's TX count (e.g., representing the total number of packets sent from the controller 100 to the access point 160) between the previous marker ID and the current marker ID. The quality determination module 226 also determines a second difference between the controller's RX count and the access point's TX count, and determines a second packet loss in a second direction from the access point 160 to the controller 100 based on the second difference. For example, the quality determination module 226 determines the second packet loss as the absolute value of the second difference which representing the number of lost packets. In another example, the quality determination module 226 determines the second packet loss as a ratio between (1) the second difference (e.g., representing the number of lost packets) and (2) the access point's TX count (e.g., representing the total number of packets sent from the access point 160 to the controller 100) between the previous marker ID and the current marker ID. The quality determination module 226 determines a link quality between the controller 100 and the access point 160 based on the first packet loss and the second packet loss.

In some embodiments, the quality determination module 226 determines whether the link quality is below a threshold. For example, the quality determination module 226 determines whether the total packet loss exceeds a predetermined percentage (e.g., 10%). If the total packet loss exceeds the predetermined percentage, the link quality is determined to be below the threshold. The quality determination module 226 generates an alert (e.g., a red flag, a warning message, etc.) indicating the link quality is below the threshold.

In some embodiments, the quality determination module 226 can determine whether the packet loss is sporadic or sustained. The quality determination module 226 can determine whether the packet loss is higher when the network throughput is higher. In some embodiments, the quality determination module 226 determines one or more network factors that may affect the link quality during the time period between the previous marker ID and the current marker ID. Example network factors include, but are not limited to, network traffic and/or network throughput, etc. The quality determination module 226 applies a weight to the packet loss in each direction based on the one or more network factors, and determines the link quality based on the weighted packet loss in each direction. For example, if the network traffic and/or throughput is low during the time period between the previous marker ID and the current marker ID, the quality determination module 226 applies a lighter weight to the packet loss in each direction to reduce the influence of the packet loss on the link quality determination, so that the link quality is not marked with a red flag if some packets are lost. However, if the network traffic and/or throughput is high during the time period between the previous marker ID and the current marker ID, the quality determination module 226 applies a heavier weight to the packet loss in each direction to increase the influence of the packet loss on the link quality determination, so that the link quality is marked with a red flag if some packets are lost.

In some embodiments, the quality determination module 226 can determine a packet round trip time between the access point 160 and the controller 100. For example, the quality determination module 226 records a first timestamp when the marker request module 224 sends a marker-request packet to the controller 100, and records a second timestamp when a marker-reply packet corresponding to the marker-request packet is received at the access point 160. The quality determination module 226 determines the packet round trip time as the time difference between the second timestamp and the first timestamp.

The report module 228 can be software including routines for generating a report. In some embodiments, the report describes the link quality between the access point 160 and the controller 100. In some embodiments, the report optionally includes an alert (e.g., a red flag or a warning message, etc.) indicating the link quality is below a threshold. The report module 228 sends the report to the controller 100 via the first communication module 220, causing the controller 100 to present the report to an administrator of the controller 100. The report facilitates the administrator to monitor the link between the access point 160 and the controller 100.

In some embodiments, if the packet loss is sustained over a period of time, indicating an under-provisioned network, the report module 228 sends a report to the controller 100 or a monitoring system. In some embodiments, if there is a packet loss in short bursts, indicating sporadic network outages and/or network choke, the report module 228 sends a report to the controller 100 or a monitoring system. The report facilitates an administrator to determine whether the packet loss is incurred by the wired network or the wireless network.

The first load adjustment module 230 can be code and routines for adjusting a network workload based on a link quality on the access point side. In some embodiments, the first load adjustment module 230 receives data describing a link quality between the access point 160 and the controller 100 from the quality determination module 226, and proactively adjusts a network workload based on the link quality. For example, the first load adjustment module 230 may reduce the network traffic between the access point 160 and the controller 100 if the link quality is low, and may increase the network traffic if the link quality is good. In a further example, assume the link quality indicates there is a sustained 20% packet loss in both communication directions between the access point 160 and the controller 100. The first load adjustment module 230 can reduce the number of packets sent from the access point 160 to the controller 100 to avoid congestion in the network. For example, the first load adjustment module 230 may reduce a small percentage of the TX packets (e.g., 10% of the TX packets) sent to the controller 100. If the link quality improves after the workload adjustment, the first load adjustment module 230 may slowly increase the number of TX packets transmitted to the controller 100.

It is beneficial to adjust the workload in the network based on the link quality. For example, if all the access points 160 connected to the controller 100 perform the workload adjustment based on the link quality, the access points 160 can save network resources without sending packets that would have been dropped midway in the network due to poor link quality. This workload adjustment may or may not reduce packet loss at the access points 160, but it can reduce overall packet loss in the network and conserve network resources.

Second Network Device for Monitoring Link Quality

Figure 3A:
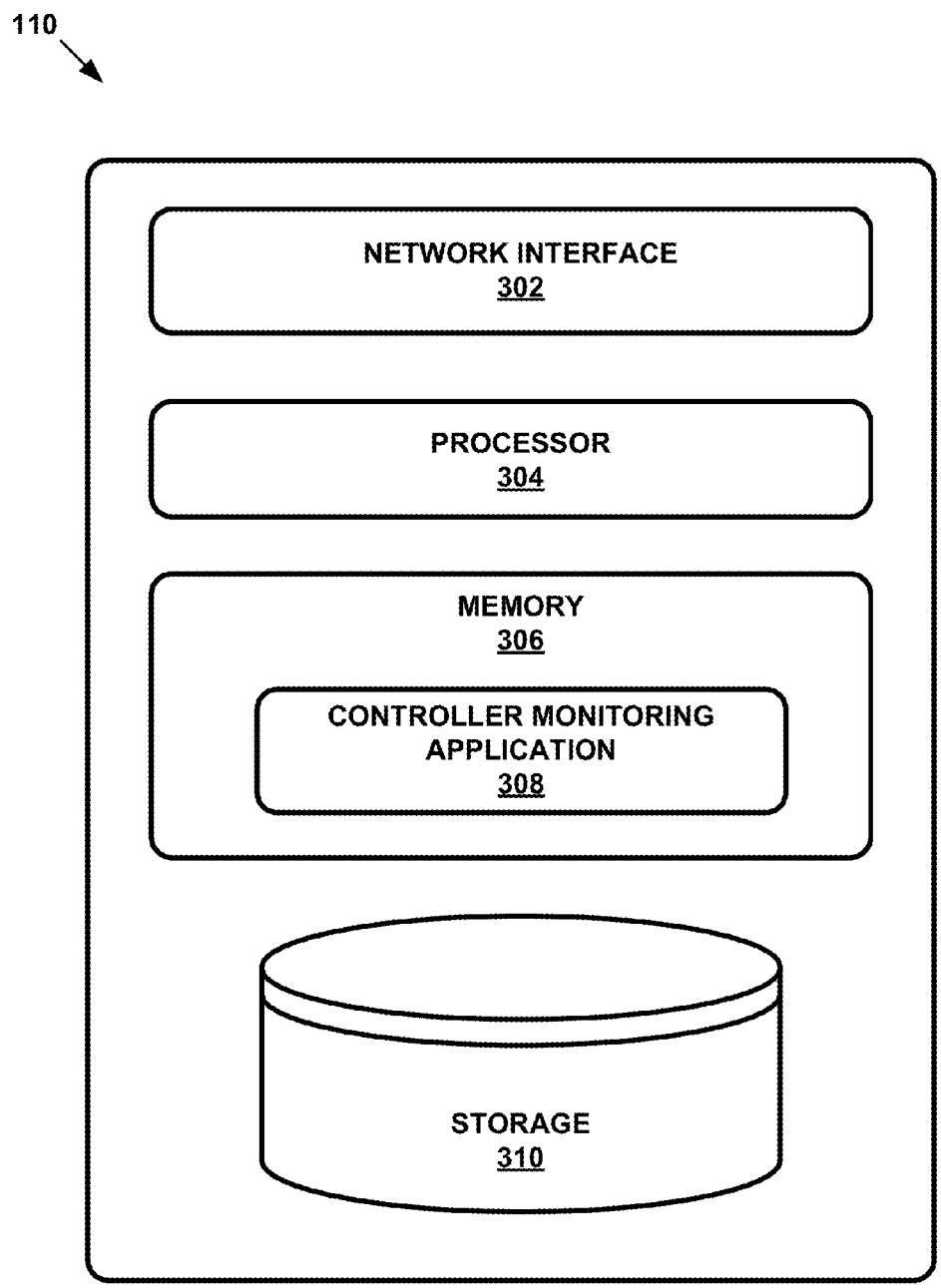
FIG. 3A is a block diagram illustrating another exemplary network device according to embodiments of the present disclosure.

FIG. 3A is a block diagram illustrating another example network device system for monitoring a link quality according to embodiments of the present disclosure. In some embodiments, the example network device is a controller 100. It should be understood that, in other embodiments, the network device may be one of a network switch, a network router, an access point, a network gateway, a network server, etc. Further, the network device may serve as a node in a distributed or a cloud computing environment.

In some embodiments, the controller 100 includes a network interface 302 capable of communicating to a wired network, a processor 304, a memory 306 and a storage device 310. The components of the controller 110 are communicatively coupled to each other. The network interface 302, the processor 304, the memory 306 and the storage device 310 have similar structure and provide similar functionality as the network interface 202, the processor 204, the memory 206 and the storage device 210, respectively. The description will not be repeated herein.

In some embodiments, the memory 306 stores a controller monitoring application 308. The controller monitoring application 308 can be code and routines for monitoring link quality on the controller side. In some embodiments, the controller monitoring application 308 can be implemented using hardware including a field-programmable gate array (FPGA) or an application-specific integrated circuit (ASIC). In some other embodiments, the controller monitoring application 308 can be implemented using a combination of hardware and software. In some embodiments, the controller monitoring application 308 may be stored in a combination of the network devices, or in one of the network devices. The controller monitoring application 308 is described below in more detail with reference to FIGS. 3B and 7.

According to embodiments of the present disclosure, the monitoring application 208 stored on the access point 160 and the controller monitoring application 308 stored on the controller 100 cooperate with each other to monitor a wired link quality between the access point 160 and the controller 100. It should be understood that, in other embodiments, the monitoring application 208 and the controller monitoring application 308 can be stored on other network devices and cooperate to perform operations similar to those described herein to monitor a link quality between the other network devices.

Controller Monitoring Application

Figure 3B:
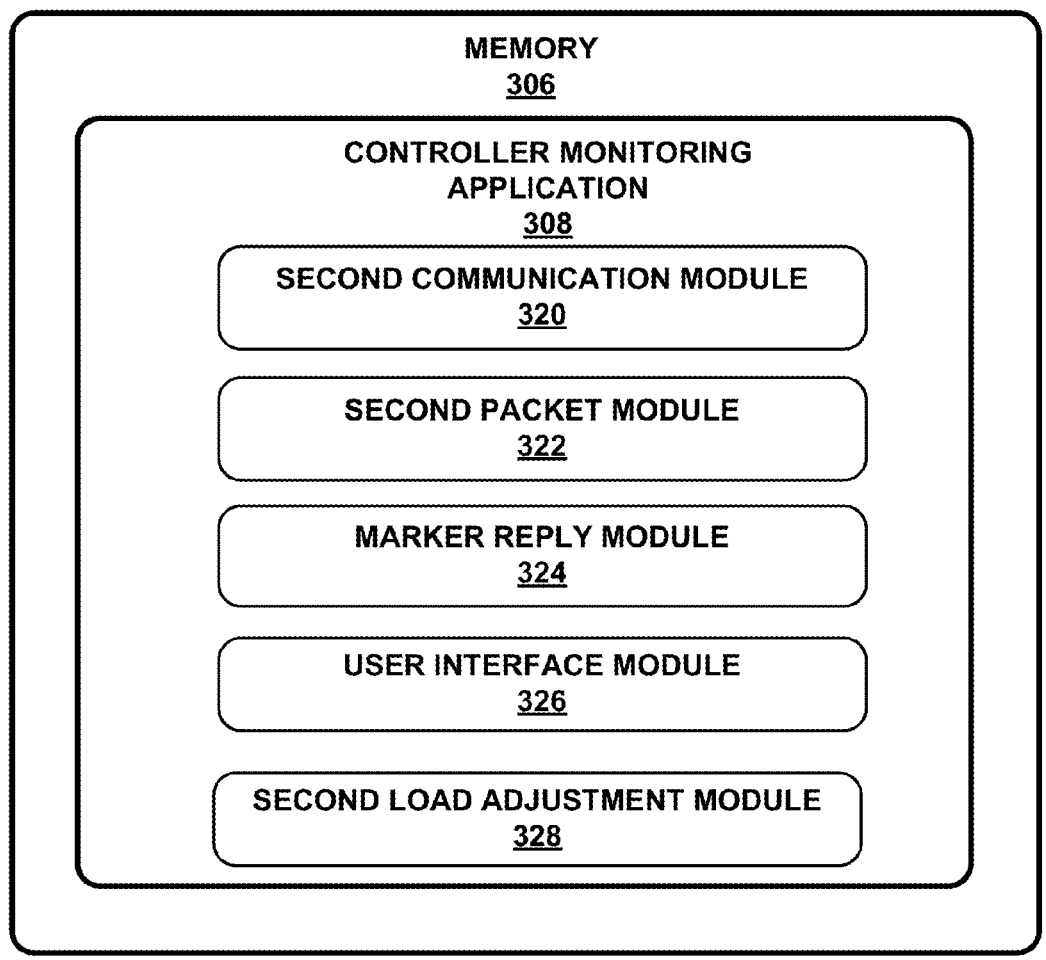
FIG. 3B is a block diagram illustrating an exemplary controller monitoring application stored on a memory according to embodiments of the present disclosure.

FIG. 3B is a block diagram illustrating an exemplary controller monitoring application 308 stored on a memory 306 according to embodiments of the present disclosure. In some embodiments, the controller monitoring application 308 includes a second communication module 320, a second packet module 322, a maker reply module 324, a user interface module 326 and a second load adjustment module 328. In some embodiments, each module of the controller monitoring application 308 can be a set of instructions executable by the processor 304 to provide the functionality described herein. In some other embodiments, each module of the controller monitoring application 308 can be stored in the memory 306 of the controller 100 and can be accessible and executable by the processor 304. Each module of the controller monitoring application 308 may be adapted for cooperation and communication with the processor 304 and other components of the controller 100 such as the network interface 302, the storage 310, etc.

The second communication module 320 can be software including routines for handling communications between the controller monitoring application 308 and other components in the digital computing environment 199. In some embodiments, the second communication module 320 sends and receives data to and from one or more of a client 170, an access point 160 and other network devices via the network interface 302. For example, the second communication module 320 receives packets from an access point 160 via the network interface 302, and forwards the received packets to the second packet module 322. In some embodiments, the second communication module 320 handles communications between components of the controller monitoring application 308.

In some embodiments, the second communication module 320 receives data from components of the controller monitoring application 308 and stores the data in the storage device 310. For example, the second communication module 320 receives data describing a controller's TX count and RX count associated with an access point 160 from the second packet module 322 and stores the controller's TX count and RX count in the storage device 310. In some embodiments, the second communication module 320 retrieves data from the storage device 310 and sends the data to components of the controller monitoring application 308. For example, the second communication module 320 retrieves data describing a controller's TX count and RX count from the storage device 310 and sends the controller's TX count and RX count to the marker reply module 324.

The second packet module 322 can be software including routines for managing packets exchanged between the controller 100 and another network device such as an access point 160. In some embodiments, for each access point 160 connected to the controller 100, the second packet module 322 at the controller 100 manages a TX counter storing a TX count and a RX counter storing a RX count. The second packet module 322 manages a plurality of TX counters and RX counters for a plurality of access points 160.

For each access point 160, the controller's TX count associated with a marker ID indicates the total number of packets that the controller 100 has already sent to the access point 160 at the time when a marker-request packet identified by the marker ID is received at the controller 100 from the access point 160. In some embodiments, the packets counted by the controller's TX count also include marker-reply packets sent from the controller 100 to the access point 160. The controller's RX count associated with a marker ID indicates the total number of packets that the controller 100 has already received from the access point 160 at the time when a marker-request packet identified by the marker ID is received at the controller 100 from the access point 160. In some embodiments, the packets counted by the controller's RX count also include marker-request packets sent from the access point 160 to the controller 100.

When the second packet module 322 receives packets at the controller 100 from an access point 160, the second packet module 322 updates the RX count in the RX counter corresponding to the access point 160. For example, the second packet module 322 increases the RX count by a number of the packets. When the second packet module 322 sends packets from the controller 100 to the access point 160, the second packet module 322 updates the TX count in the TX counter corresponding to the access point 160. For example, the second packet module 322 increases the TX count by a number of the packets. Before exchanging packets between the access point 160 and the controller 100, the second packet module 322 at the controller 100 may initialize the TX count and the RX count corresponding to the access point 160 to be an initial value such as zero.

In some embodiments, the second packet module 322 stores the controller's TX count (e.g., the number of TX packets sent to the access point 160) and RX count (e.g., the number of RX packets received from the access point 160) since receiving the last marker-request packet from the access point 160. For example, assume the last marker-request packet is a packet with marker ID=100. The second packet module 322 uses the controller's TX count to record the number of TX packets sent to the access point 160 since the controller 100 receives the packet with marker ID=100, and uses the controller's RX count to record the number of RX packets received from the access point 160 since the controller 100 receives the packet with marker ID=100.

Next, the controller 100 may receive a marker-request packet with marker ID=101. In this case, the controller's TX count records the number of TX packets between the marker ID=100 and the marker ID=101, and the controller's RX count records the number of RX packets between the marker ID=100 and the marker ID=101.

However, if the controller 100 only receives the marker-request packet with marker ID=106 without receiving the marker-request packets with marker IDs from 101 to 105, then the controller's TX count records the number of TX packets between the marker ID=100 and the marker ID=106, and the controller's RX count records the number of RX packets between the marker ID=100 and the marker ID=106. Correspondingly, the controller 100 generates a marker-reply packet responding to the marker-request packet with marker ID=106, where the marker-reply packet includes a previous marker ID=100, a current marker ID=106, the controller's TX count and RX count between marker ID=100 and marker ID=106.

The marker-reply module 324 can be software including routines for generating marker-reply packets. In some embodiments, the marker-reply module 324 receives a marker-request packet from an access point 160 via the second communication module 320. The marker-reply module 324 at the controller 100 updates a current marker ID associated with the access point 160 to be a marker ID included in the marker-request packet, and stores the updated current marker ID in the storage device 310. The marker-reply module 324 determines a previous marker ID associated with the access point 160. A previous marker ID is a last marker ID included in a last marker-request packet received at the controller 100 from the access point 160. The marker-reply module 324 retrieves data describing the controller's TX count and RX count associated with the previous marker ID from the storage 310.

The marker-reply module 324 determines the controller's TX count and RX count for the access point 160 between the previous marker ID and the current marker ID. For example, assume the previous marker ID is marker ID=1 and the current marker ID is marker ID=2. If the controller's TX count for the access point 160 at marker ID=1 and marker ID=2 is 1234 and 1345 respectively, the controller's TX count between marker ID=1 and marker ID=2 is 111 (1345−1234=111). If the controller's RX count for the access point 160 at marker ID=1 and marker ID=2 is 1200 and 1300 respectively, the controller's RX count for the access point 160 between marker ID=1 and marker ID=2 is 100 (1300−1200=100).

The marker reply module 324 generates a marker-reply packet that responds to the marker-request packet. The marker-reply packet includes the previous marker ID, the current marker ID, the controller's TX count and RX count for the access point 160 between the previous marker ID and the current marker ID. The marker reply module 324 sends the marker-reply packet to the access point 160 via the second communication module 320. In some embodiments, a periodic heartbeat packet sent from the controller 100 to the access point 160 can be reused as a marker-reply packet.

In some embodiments, the controller 100 is connected to a plurality of access points 160. The marker-reply module 324 receives maker-request packets from the plurality of access points 160, generates marker-reply packets responsive to the marker-request packets, and sends the marker-reply packets to the plurality of access points 160 respectively.

The user interface module 326 can be software including routines for generating graphical data for providing a user interface. In some embodiments, the user interface module 326 receives data describing a report from an access point 160, and generates graphical data for providing a user interface that depicts the report to an administrator of the controller 100. In some embodiments, the user interface module 326 aggregates reports received from a plurality of access points 160, and presents the aggregated reports to the administrator using a user interface. In some examples, the user interface depicts a trend chart of link quality for each access point 160. The user interface module 326 may provide other user interfaces to the administrator, facilitating the administrator to monitor the link quality.

The second load adjustment module 328 can be code and routines for adjusting network workload on the controller side. For example, the second load adjustment module 328 may adjust the network traffic based on the link quality between the controller 100 and one or more access points 160. The second load adjustment module 328 provides similar functionality as the first load adjustment module 230, and the description will not be repeated herein.

In some embodiments, the second load adjustment module 328 receives reports describing link quality from a plurality of access points 160 connected to the controller 100. Based on the link quality described in the reports, the second load adjustment module 328 determines whether congestion in the network is caused by an under-provisioned uplink at the controller 100. For example, the second load adjustment module 328 determines whether congestion in the network is caused by low bandwidth at the uplink of the controller 100. The second load adjustment module 328 may inform an administrator if the congestion is caused by an under-provisioned uplink of the controller 100.

Processes for Monitoring Link Quality

Figure 4:
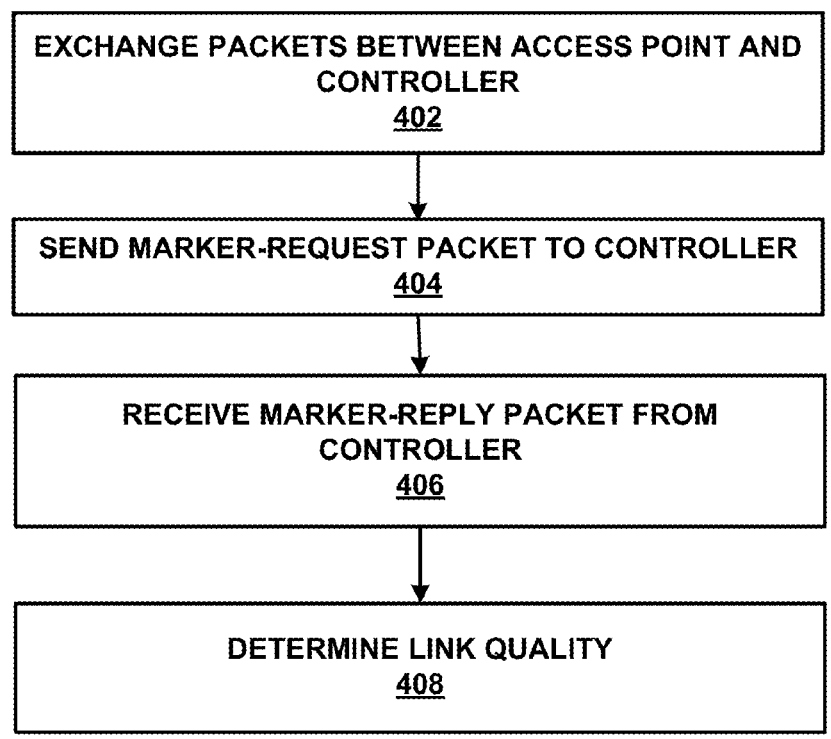
FIG. 4 illustrates an exemplary process for monitoring link quality performed on an access point according to embodiments of the present disclosure.

FIG. 4 is a flowchart illustrating an exemplary process 400 for monitoring a link quality performed on an access point 160 according to embodiments of the present disclosure. In some embodiments, the first packet module 222 exchanges packets between the access point 160 and the controller 100 via the first communication module 220 and the network interface 202 (operation 402). The marker request module 224 sends a marker-request packet to the controller 100 via the first communication module 220 and the network interface 202 (operation 404). The quality determination module 226 receives a marker-reply packet from the controller 100 via the first communication module 220 and the network interface 202 (operation 406). The marker-reply packet corresponds to the marker-request packet. The quality determination module 226 determines a link quality between the access point 160 and the controller 100 based at least in part on data included in the marker-reply packet (operation 408).

Figure 5:
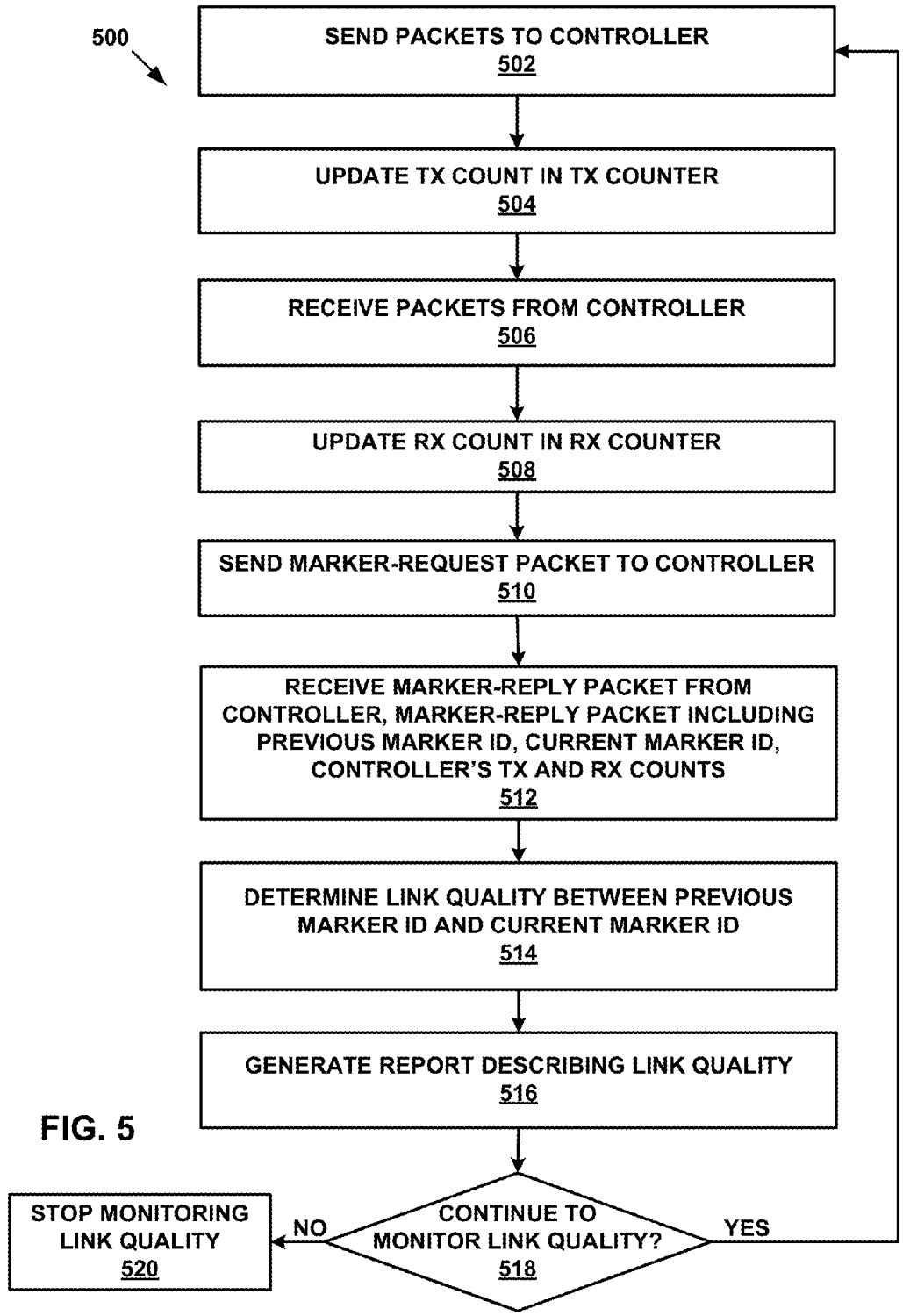
FIG. 5 illustrates another exemplary process for monitoring link quality performed on an access point according to embodiments of the present disclosure.

FIG. 5 is a flowchart illustrating another exemplary process 500 for monitoring a link quality performed on an access point 160 according to embodiments of the present disclosure. In some embodiments, the first packet module 222 sends packets to the controller 100 via the first communication module 220 and the network interface 202 (operation 502). The first packet module 222 updates a TX count in a TX counter describing a number of packets sent from the access point 160 to the controller 100 (operation 504). The first packet module 222 receives packets from the controller 100 via the first communication module 220 and the network interface 202 (operation 506). The first packet module 222 updates a RX count in a RX counter describing a number of packets received at the access point 160 from the controller 100 (operation 508). The marker request module 224 generates and sends a marker-request packet to the controller 100 (operation 510).

The quality determination module 226 receives a marker-reply packet from the controller 100 via the first communication module 220 and the network interface 202 (operation 512). The marker-reply packet includes a previous marker ID, a current marker ID, the controller's TX count and RX count for the access point 160 between the previous marker ID and current marker ID. The quality determination module 226 determines a link quality between the previous marker ID and the current marker ID for the wired link between the access point 160 and the controller 100 (operation 514). The report module 228 generates a report describing the link quality (operation 516). The report module 228 may send the report to the controller 100. The monitoring application 208 determines whether to continue monitoring the link quality (operation 518). If the monitoring application 208 determines to continue monitoring the link quality, the process 500 moves to operation 502. Otherwise, the monitoring application 208 stops monitoring the link quality (operation 520).

Figure 6A:
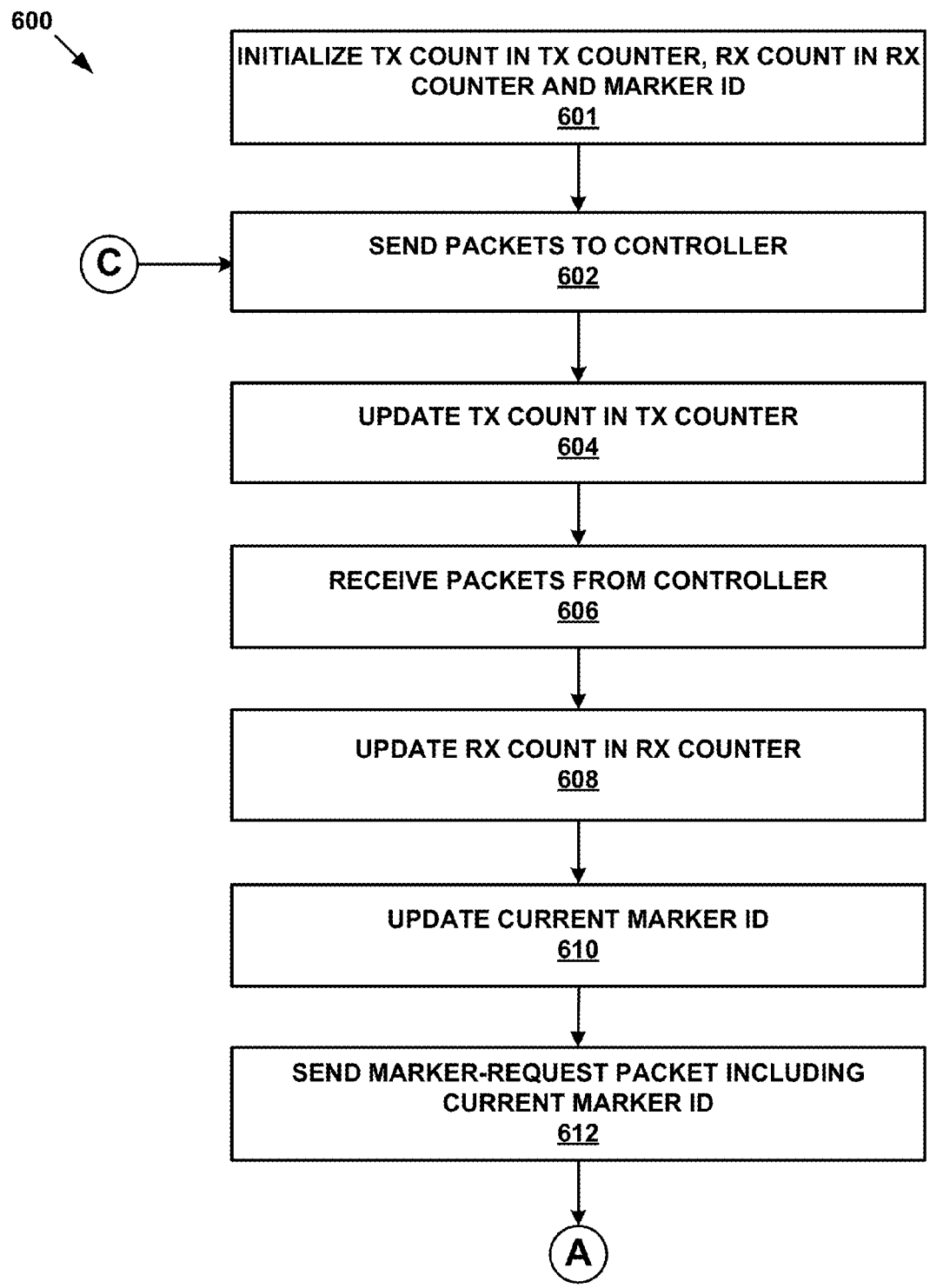
FIGS. 6A-6C illustrate yet another exemplary process for monitoring link quality performed on an access point according to embodiments of the present disclosure.
Figure 6B:
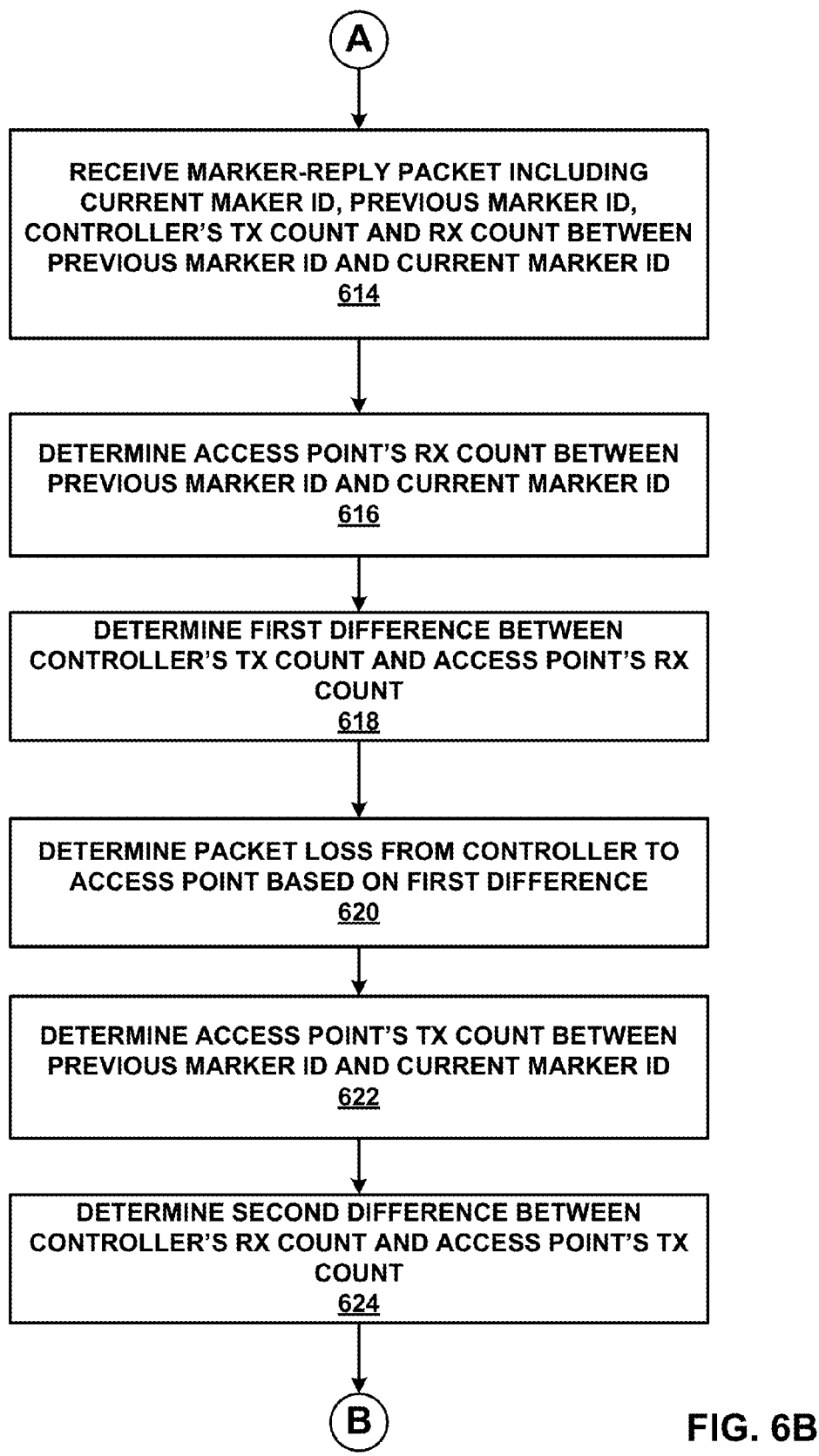
Figure 6C:
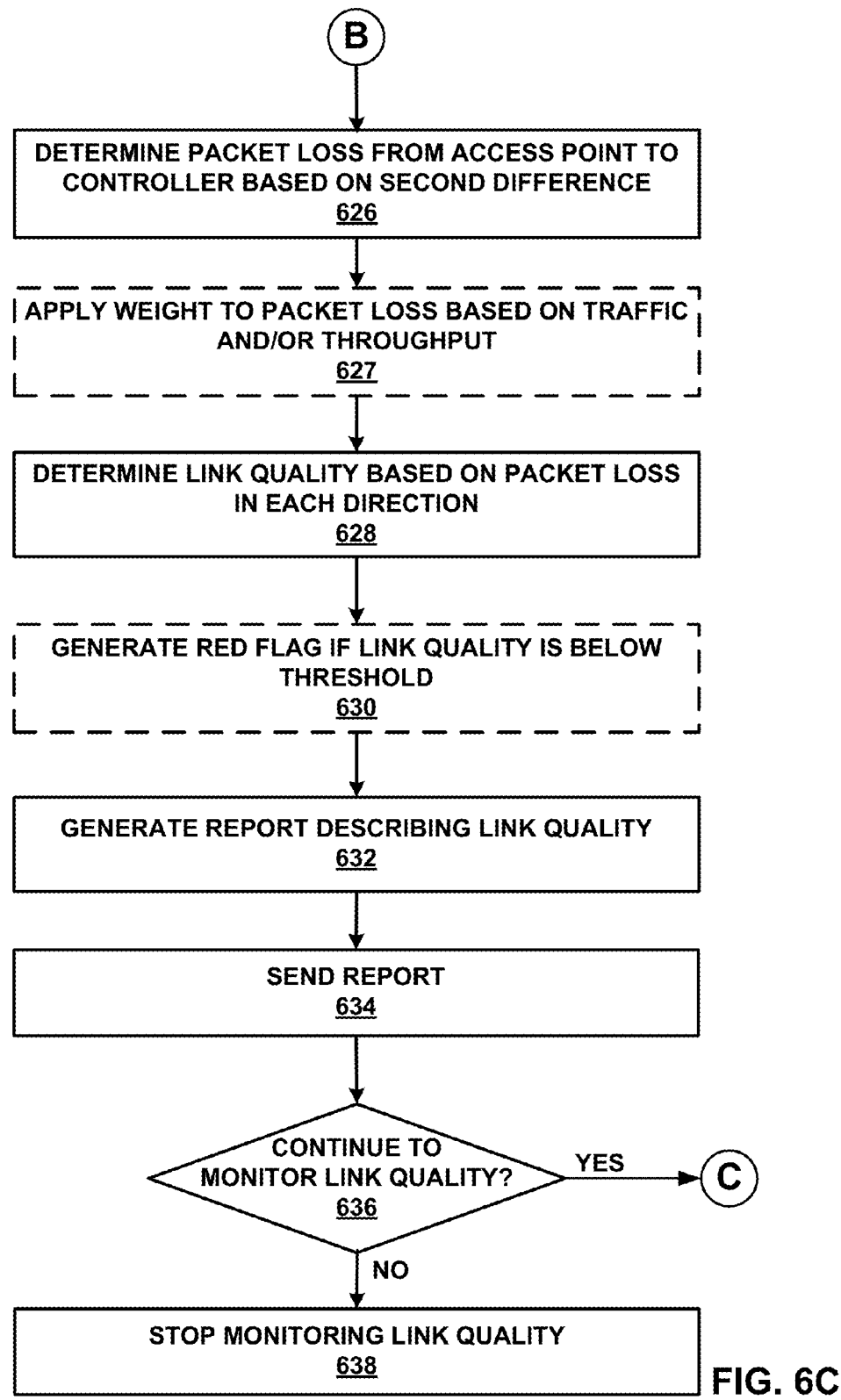

FIGS. 6A-6C are flowcharts illustrating yet another exemplary process 600 for monitoring a link quality performed on an access point 160 according to embodiments of the present disclosure. Referring to FIG. 6A, the first packet module 222 initializes a TX count in a TX counter, a RX count in a RX counter and a marker ID to be an initial value (operation 601). The first packet module 222 sends packets to the controller 100 via the first communication module 220 and the network interface 202 (operation 602). The first packet module 222 updates the TX count in the TX counter (operation 604). The first packet module 222 receives packets from the controller 100 via the first communication module 220 and the network interface 202 (operation 606). The first packet module 222 updates the RX count in the RX counter (operation 608). The marker request module 224 updates a current marker ID (operation 610). The marker request module 224 generates and sends a marker-request packet including the current marker ID to the controller 100 via the first communication module 220 and the network interface 202 (operation 612).

Referring to FIG. 6B, the quality determination module 226 receives a marker-reply packet from the controller 100 via the first communication module 220 and the network interface 202 (operation 614). The marker-reply packet includes the current marker ID, a previous marker ID, the controller's TX count and RX count between the previous marker ID and the current marker ID. The quality determination module 226 determines the access point's RX count between the previous marker ID and the current marker ID (operation 616). The quality determination module 226 determines a first difference between the controller's TX count and the access point's RX count (operation 618). The quality determination module 226 determines a packet loss from the controller 100 to the access point 160 based on the first difference (operation 620). The quality determination module 226 determines the access point's TX count between the previous marker ID and the current marker ID (operation 622). The quality determination module 226 determines a second difference between the controller's RX count and the access point's TX count (operation 624).

Referring to FIG. 6C, the quality determination module 226 determines a packet loss from the access point 160 to the controller 100 based on the second difference (operation 626). Optionally, the quality determination module 226 applies a weight to the packet loss in each direction based on one or more network factors such as network traffic and/or throughput (operation 627). The quality determination module 226 determines a link quality between the access point 160 and the controller 100 based on the packet loss in each direction (operation 628). Optionally, if the link quality is below a threshold, the quality determination module 226 generates a red flag for the link quality (operation 630). The report module 228 generates a report describing the link quality (operation 632). The report module 228 sends the report to the controller 100 via the first communication module 220 and the network interface 202 (operation 634), causing the controller 100 to present the report to an administrator using a user interface. The monitoring application 208 determines whether to continue monitoring the link quality (operation 636). If the monitoring application 208 determines to continue monitoring the link quality, the process 600 moves to operation 602. Otherwise, the monitoring application 208 stops monitoring the link quality (operation 638).

Figure 7:
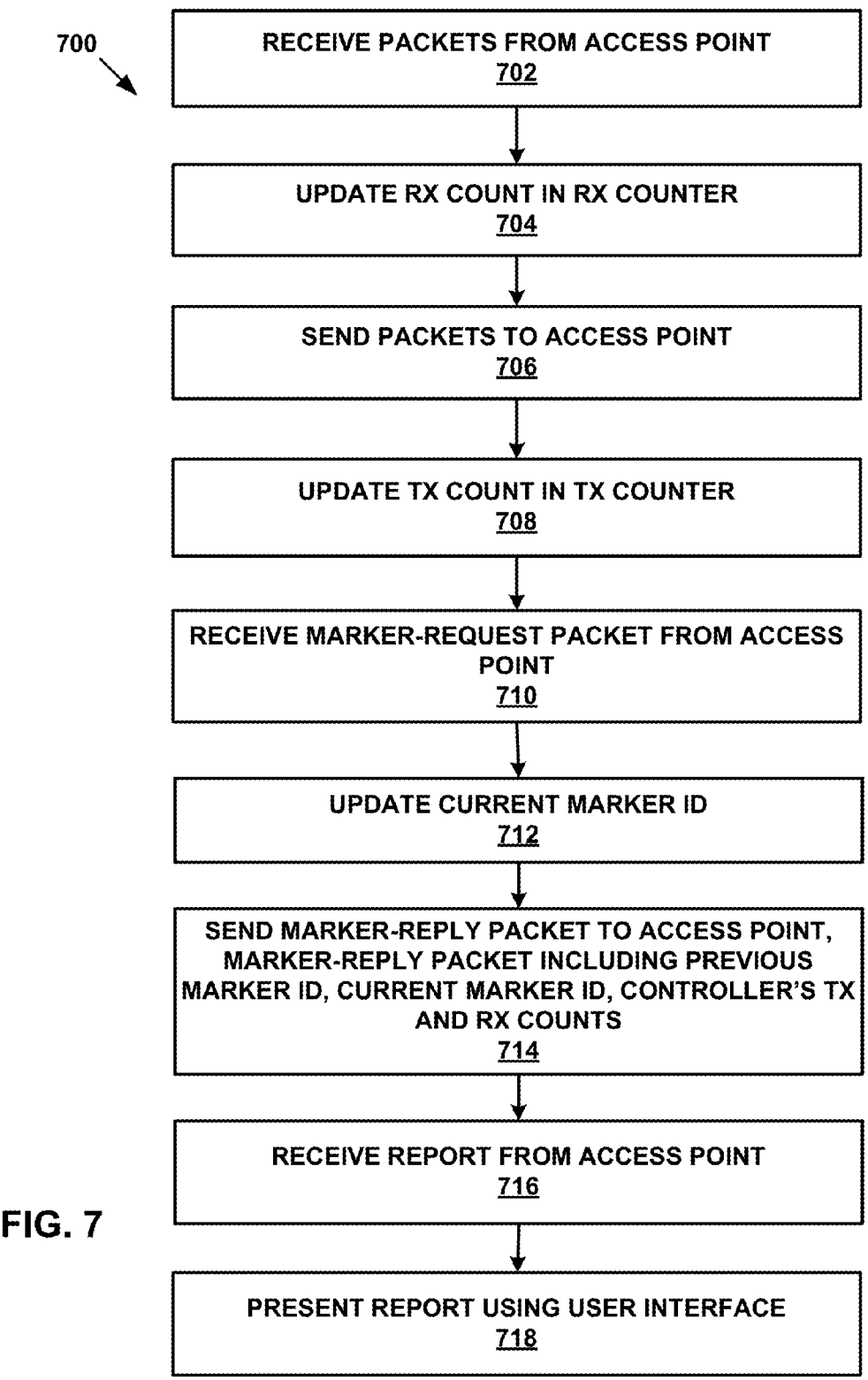
FIG. 7 illustrates an exemplary process for monitoring link quality performed on a controller according to embodiments of the present disclosure.

FIG. 7 is a flowchart illustrating an exemplary process 700 for monitoring a link quality performed on a controller 100 according to embodiments of the present disclosure. In some embodiments, the second packet module 322 receives packets at the controller 100 from an access point 160 via the second communication module 320 and the network interface 302 (operation 702). The second packet module 322 updates a RX count in a RX counter associated with the access point 160 at the controller 100 (operation 704). The second packet module 322 sends packets from the controller 100 to the access point 160 via the second communication module 320 and the network interface 302 (operation 706). The second packet module 322 updates a TX count in a TX counter associated with the access point 160 at the controller 100 (operation 708).

The marker reply module 324 receives a marker-request packet from the access point 160 (operation 710). The marker reply module 324 updates a current marker ID to be a marker ID included in the marker-request packet (operation 712). The marker reply module 324 generates and sends a marker-reply packet to the access point 160 responsive to the marker-request packet (operation 714). The marker-reply packet includes a previous marker ID, the current marker ID, the controller's TX count and RX count between the previous marker ID and the current marker ID. The user interface module 326 receives a report from the access point 160 via the second communication module 320 and the network interface 302 (operation 716). The user interface module 326 presents the report to an administrator of the controller 100 using a user interface (operation 718).

Event Diagrams for Monitoring Link Quality

FIGS. 8A-8D are event diagrams illustrating an exemplary process for monitoring a link quality between an access point 160 and a controller 100 according to embodiments of the present disclosure. The access point 160 includes a monitoring application 208 that includes a first communication module 220, a first packet module 222, a marker request module 224, a quality determination module 226 and a report module 228. The controller 100 includes a controller monitoring application 308 that includes a second communication module 320, a second packet module 322, a marker reply module 324 and a user interface module 326.

Figure 8A:
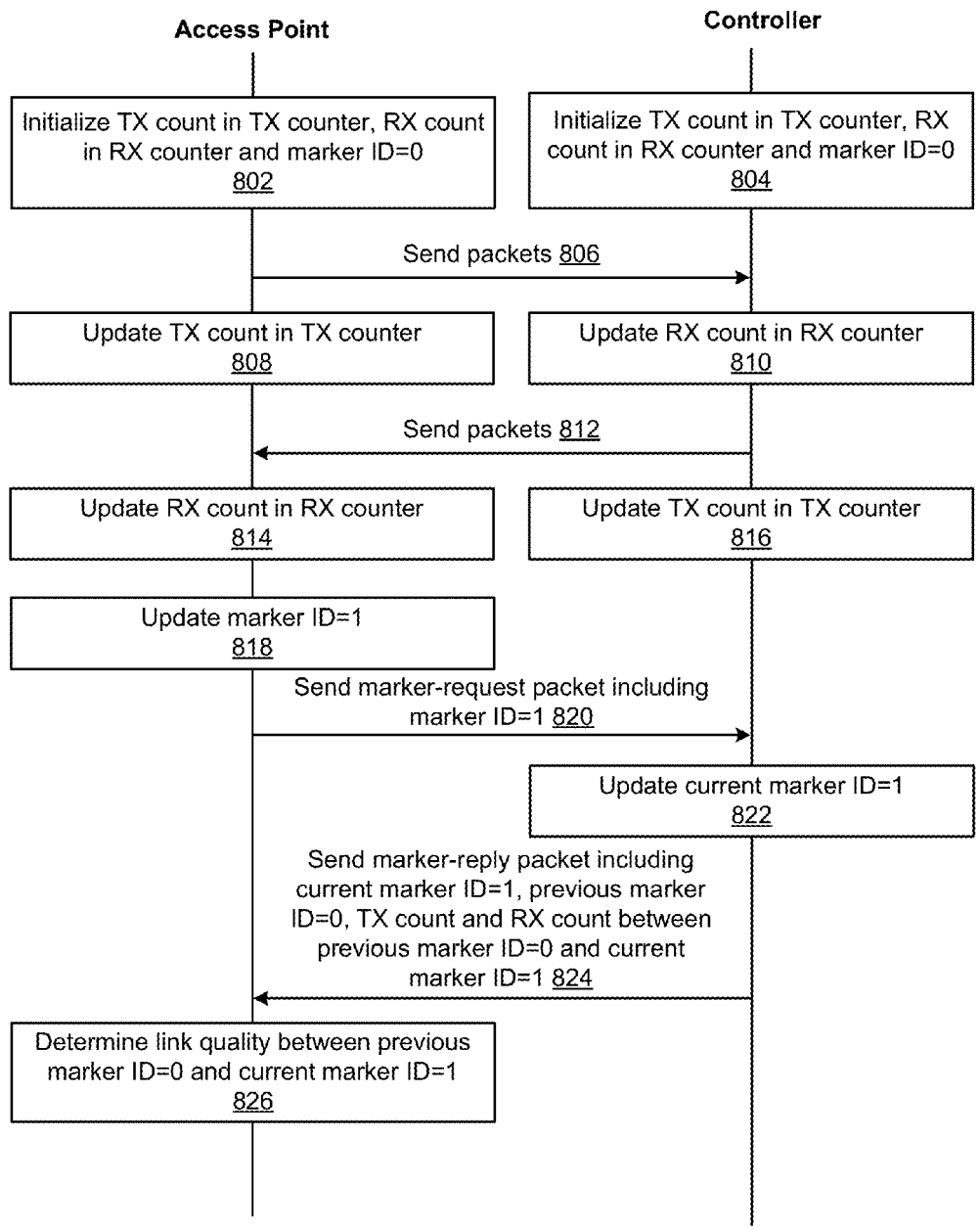
FIGS. 8A-8D are event diagrams illustrating an exemplary process for monitoring link quality between an access point and a controller according to embodiments of the present disclosure.

Referring to FIG. 8A, before exchanging packets with the controller 100, the first packet module 222 initializes the access point's TX count in a first TX counter, the access point's RX count in a first RX counter and a marker ID (e.g., marker ID=0) (operation 802). The first TX counter and the first RX counter are stored on the access point 160. The second packet module 322 initializes the controller's TX count in a second TX counter, the controller's RX count in a second RX counter and a marker ID (e.g., marker ID=0) (operation 804). The second TX counter and the second RX counter are associated with the access point 160 and stored on the controller 100. The first packet module 222 sends packets to the second packet module 322 (operation 806). The first packet module 222 updates the access point's TX count in the first TX counter (operation 808). The second packet module 322 updates the controller's RX count in the second RX counter after receiving packets from the access point 160 (operation 810). In some examples, some of the packets sent from the access point 160 to the controller 100 are lost on the way.

The second packet module 322 may also send packets to the access point 160 (operation 812), and updates the controller's TX count for the access point 160 in the second TX counter (operation 816). The first packet module 222 updates the access point's RX count in the first RX counter after receiving packets from the controller 100 (operation 814). In some examples, some of the packets sent from the controller 100 to the access point 160 are lost on the way. The marker request module 224 updates the marker ID to be 1 (operation 818), and sends a marker-request packet including the marker ID=1 to the controller 100 (operation 820). The marker reply module 324 receives the marker-request packet from the access point 160, and updates current marker ID to be 1 according to the marker-request packet (operation 822). The marker reply module 324 generates and sends a marker-reply packet to the access point 160 (operation 824), where the marker-reply packet includes a previous marker ID=0, a current marker ID=1, the controller's TX count and RX count between marker ID=0 and marker ID=1. The quality determination module 226 determines a link quality between the marker ID=0 and the marker ID=1 for the link between the access point 160 and the controller 100 (operation 826).

Figure 8B:
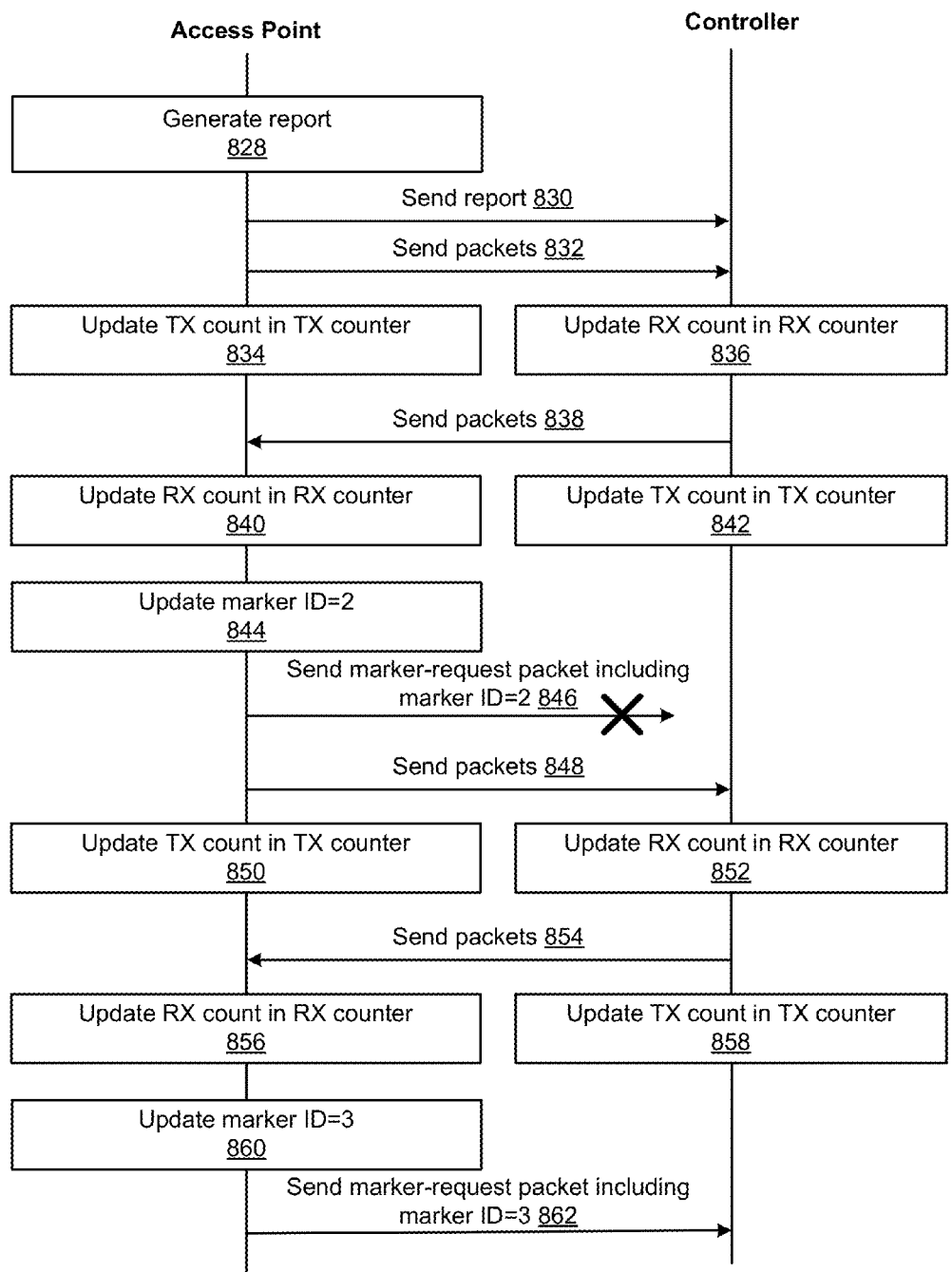

Referring to FIG. 8B, the report module 228 generates a report describing the link quality (operation 828), and sends the report to the user interface module 326 (operation 830). The user interface module 326 may present the report to an administrator via a user interface. Next, the first packet module 222 continues to send packets to the controller 100 (operation 832). The first packet module 222 updates the access point's TX count in the first TX counter (operation 834). The second packet module 322 updates the controller's RX count in the second RX counter after receiving packets from the access point 160 (operation 836). The second packet module 322 may also send packets to the access point 160 (operation 838), and updates the controller's TX count for the access point 160 in the second TX counter (operation 842). The first packet module 222 updates the access point's RX count in the first RX counter after receiving packets from the controller 100 (operation 840). The marker request module 224 updates the marker ID to be 2 (operation 844), and sends a marker-request packet including the marker ID=2 to the controller 100 (operation 846). However, the marker-request packet is lost on the way. The marker reply module 324 at the controller 100 does not receive the marker-request packet and does not respond with a marker-reply packet.

Next, the first packet module 222 continues to send packets to the controller 100 (operation 848). The first packet module 222 updates the access point's TX count in the first TX counter (operation 850). The second packet module 322 updates the controller's RX count in the second RX counter after receiving packets from the access point 160 (operation 852). The second packet module 322 may also send packets to the access point 160 (operation 854), and updates the controller's TX count for the access point 160 in the second TX counter (operation 858). The first packet module 222 updates the access point's RX count in the first RX counter after receiving packets from the controller 100 (operation 856). The marker request module 224 updates the marker ID to be 3 (operation 860) and sends a marker-request packet including the marker ID=3 to the controller 100 (operation 862).

Figure 8C:
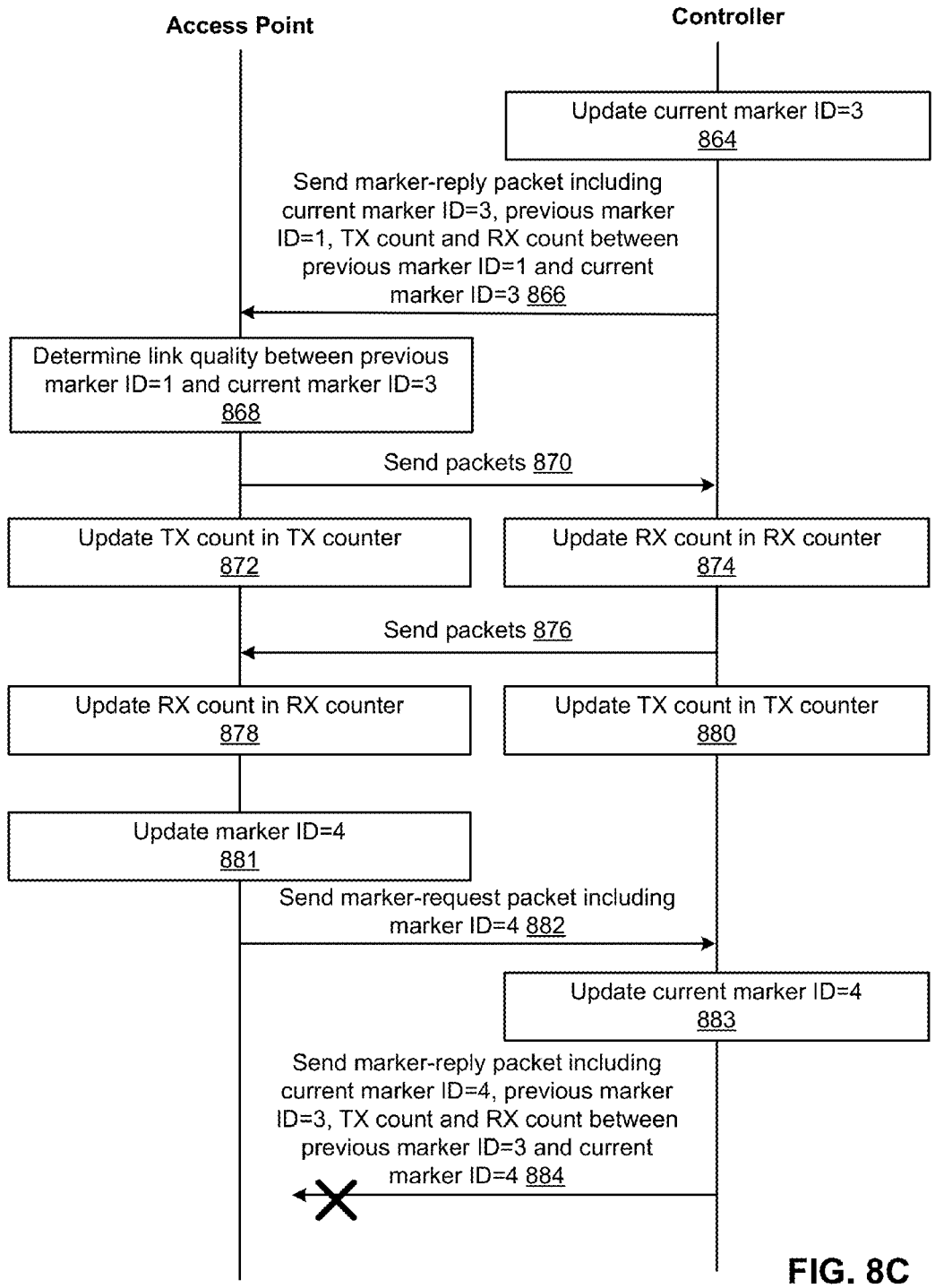

Referring to FIG. 8C, the marker reply module 324 receives the marker-request packet from the access point 160, and updates the current marker ID to be 3 according to the marker-request packet (operation 864). The marker reply module 324 generates and sends a marker-reply packet to the access point 160 (operation 866), where the marker-reply packet includes a previous marker ID=1, a current marker ID=3, the controller's TX count and RX count between marker ID=1 and marker ID=3. Because the marker-request packet with marker ID=2 is lost on the way and does not arrive at the controller 100, the previous marker ID stored on the controller 100 is marker ID=1 rather than marker ID=2. The quality determination module 226 determines a link quality between the marker ID=1 and the marker ID=3 for the link between the access point 160 and the controller 100 (operation 868). The monitoring of the link quality is not interrupted by the loss of the marker-request packet identified by the marker ID=2.

Next, the first packet module 222 continues to send packets to the controller 100 (operation 870). The first packet module 222 updates the access point's TX count in the first TX counter (operation 872). The second packet module 322 updates the controller's RX count in the second RX counter after receiving packets from the access point 160 (operation 874). The second packet module 322 may also send packets to the access point 160 (operation 876), and updates the controller's TX count for the access point 160 in the second TX counter (operation 880). The first packet module 222 updates the access point's RX count in the first RX counter after receiving packets from the controller 100 (operation 878). The marker request module 224 updates the current marker ID to be 4 (operation 881), and sends a marker-request packet including the marker ID=4 to the controller 100 (operation 882).

The marker reply module 324 receives the marker-request packet from the access point 160, and updates the current marker ID to be 4 according to the marker-request packet (operation 883). The marker reply module 324 generates and sends a marker-reply packet to the access point 160 (operation 884), where the marker-reply packet includes a previous marker ID=3, a current marker ID=4, the controller's TX count and RX count between marker ID=3 and marker ID=4. However, the marker-reply packet is lost on the way, and does not arrive at the access point 160. Because the marker-reply packet including the previous marker ID=3 and the current marker ID=4 is lost on the way, the quality determination module 226 does not determine the link quality between marker ID=3 and marker ID=4.

Figure 8D:
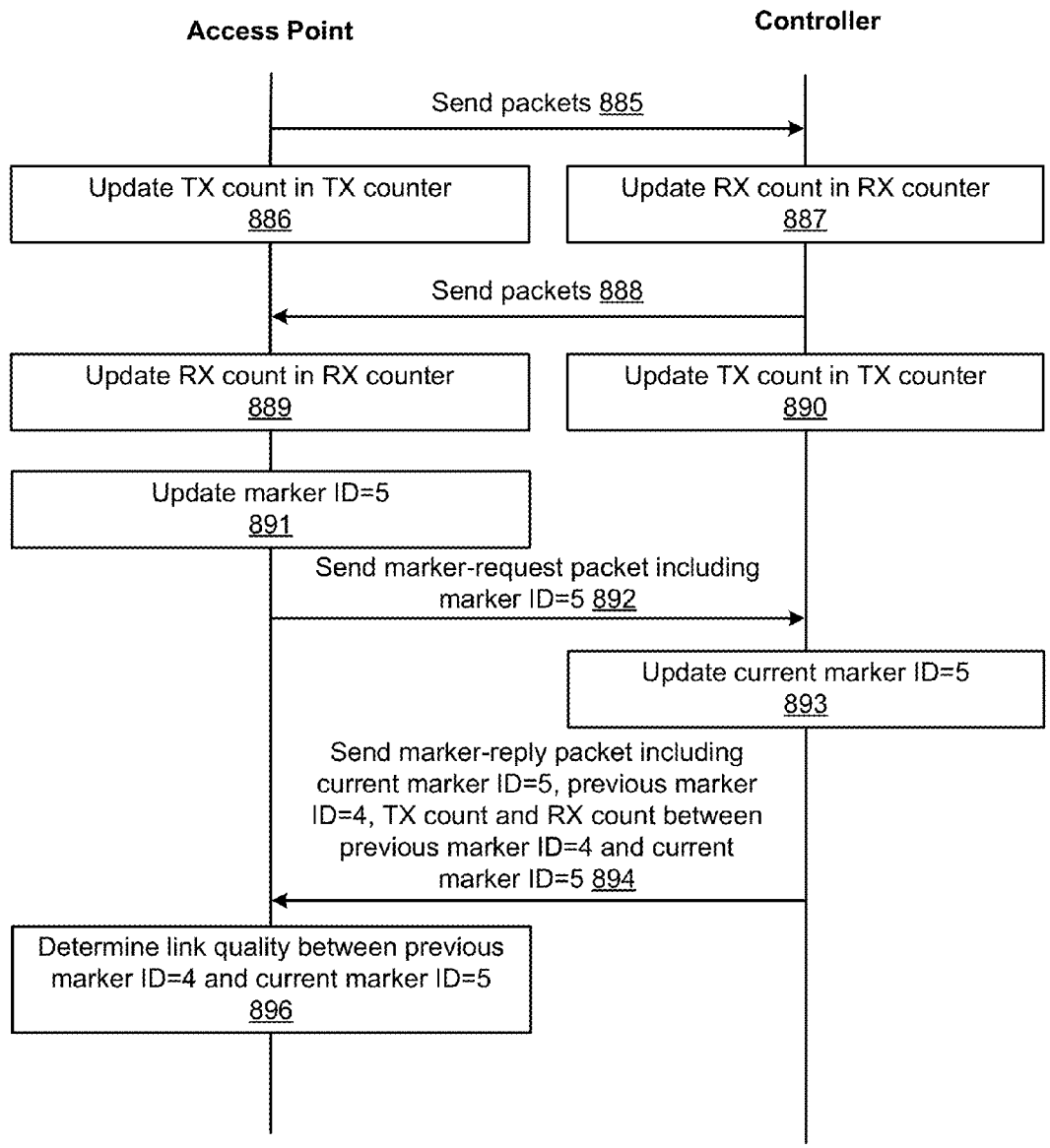

Referring to FIG. 8D, the first packet module 222 continues to send packets to the controller 100 (operation 885). The first packet module 222 updates the access point's TX count in the first TX counter (operation 886). The second packet module 322 updates the controller's RX count in the second RX counter after receiving packets from the access point 160 (operation 887). The second packet module 322 may also send packets to the access point 160 (operation 888), and updates the controller's TX count for the access point 160 in the second TX counter (operation 890). The first packet module 222 updates the access point's RX count in the first RX counter after receiving packets from the controller 100 (operation 889). The marker request module 224 updates the current marker ID to be 5 (operation 891), and sends a marker-request packet including the marker ID=5 to the controller 100 (operation 892).

The marker reply module 324 receives the marker-request packet from the access point 160, and updates the current marker ID to be 5 according to the marker-request packet (operation 893). The marker reply module 324 generates and sends a marker-reply packet to the access point 160 (operation 894), where the marker-reply packet includes a previous marker ID=4, a current marker ID=5, the controller's TX count and RX count between marker ID=4 and marker ID=5. The quality determination module 226 determines a link quality between the previous marker ID=4 and the current marker ID=5 for the link between the access point 160 and the controller 100 (operation 896). The monitoring of the link quality is not interrupted by the loss of the marker-reply packet at operation 884.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Input/output or I/O devices (including but not limited to keyboards, displays, pointing devices, etc.) can be coupled to the system either directly or through intervening I/O controllers.

The particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising a set of instructions which, when executed by one or more hardware processors, causes performance of a set of operations comprising:
    generating, by a first internetworking device, a first packet comprising statistics transmitted by either the first internetworking device or a second internetworking device to the other of the second internetworking device or the first internetworking device;
    generating, by the second internetworking device, a second packet comprising statistics transmitted by either the first internetworking device or the second internetworking device to the other of the second internetworking device or the first internetworking device; and
    determining, at the first internetworking device, a link quality between the first internetworking device and the second internetworworking device,
    wherein determining the link quality comprises determining transmission counts and receiving counts associated with the first and second packets, determining a first packet loss and a second packet loss based on the transmission counts and the receiving counts, applying a weight to the first packet loss and the second packet loss based on at least one network factor that affects the link quality, and determining the link quality based on the weighted packet losses.

2. The computer readable medium of claim 1, wherein the first internetworking device is an access point or a controller and the second internetworking device is an access point or a controller.

3. The computer readable medium of claim 1, wherein the first packet comprising statistics includes a plurality of packets transmitted by either the first internetworking device or the second internetworking device to the other of the second internetworking device or the first internetworking device and the second packet comprising statistics includes a plurality of packets transmitted by either the first internetworking device or a second internetworking device to the other of the second internetworking device or the first internetworking device.

4. The computer readable medium of claim 1, further comprising:
 comparing, at a third internetworking device, statistics transmitted by either the first internetworking device or a second internetworking device to the other of the second internetworking device or the first internetworking device over a period of time; and
 determining, at the third internetworking device, a link quality between the first internetworking device and the second internetworking device.

5. The computer readable medium of claim 1, wherein:
 the transmission counts and the receiving counts include a transmitting (TX) count and a receiving (RX) count between a previous marker ID and a current marker ID, wherein the TX count and the RX count are included in a marker-reply packet;
 the TX count and the RX count are counted by the second internetworking device;
 the TX count indicates a number of packets sent by the second internetworking device to the first internetworking device between the previous marker ID and the current marker ID; and
 the RX count indicates a number of packets received at the second internetworking device from the first internetworking device between the previous marker ID and the current marker ID.

6. The computer readable medium of claim 1, wherein determining the link quality comprises:
 determining a first TX count and a first RX count between the previous marker ID and the current marker ID, the first TX count and the first RX count being counted by the first internetworking device;
 determining, from the marker-reply packet, a second TX count and a second RX count between the previous marker ID and the current marker ID, the second TX count and the second RX count being counted by the second internetworking device, wherein the transmission counts and the receiving counts include the first and second TX counts and the first and second RX counts;
 determining a first packet loss in a direction from the first internetworking device to the second internetworking device based on a difference between the first TX count and the second RX count;
 determining a second packet loss in a direction from the second internetworking device to the first internetworking device based on a difference between the second TX count and the first RX count, wherein the packet losses include the first and second packet losses; and
 determining the link quality based on the first packet loss and the second packet loss.

7. The computer readable medium of claim 1, further comprising:
 determining that the link quality is below a threshold; and
 generating an alert indicating the link quality is below a threshold.

8. The computer readable medium of claim 1, further comprising:
 generating a report including data describing the link quality; and
 sending the report to the second internetworking device.

9. A system comprising:
 a processor; and
 a memory storing instructions that, when executed by the processor, cause the system to:
 generate, at a first internetworking device, a marker-request packet that includes a current marker ID;
 send, from the first internetworking device, the marker-request packet to a second internetworking device;
 receive, at the first internetworking device, a marker-reply packet that responds to the marker-request packet from the second internetworking device, the marker-reply packet including the current marker ID and a previous marker ID;
 determine packet losses between the first internetworking device and the second internetworking device based on information associated with the current marker ID and the previous marker ID;
 determine at least one network factor that affects link quality between the first internetworking device and the second internetworking device;
 apply a weight to the packet losses based on the at least one network factor; and
 determine, at the first internetworking device, the link quality between the first internetworking device and the second internetworking device based on the weighted packet losses.

10. The system of claim 9, wherein the first internetworking device is an access point or a controller and the second internetworking device is an access point or a controller.

11. The system claim 9, wherein the system is further caused to:
 at least one of transmit a plurality of packets to the second internetworking device prior to receiving the marker-reply packet, and receive a plurality of packets from the second internetworking device prior to receiving the marker-reply packet, wherein the link quality is determined based on at least one of the transmitted and received plurality of packets.

12. The system of claim 9, further comprising:
 comparing, at a third internetworking device, statistics transmitted by either the first internetworking device or a second internetworking device to the other of the second internetworking device or the first internetworking device over a period of time; and
 determining, at the third internetworking device, the link quality between the first internetworking device and the second internetworking device.

13. The system of claim 9, wherein:
 the marker-reply packet includes a transmitting (TX) count and a receiving (RX) count between the previous marker ID and the current marker ID;
 the TX count and the RX count are counted by the second internetworking device;
 the TX count indicates a number of packets sent by the second internetworking device to the first internetworking device between the previous marker ID and the current marker ID; and
 the RX count indicates a number of packets received at the second internetworking device from the first internetworking device between the previous marker ID and the current marker ID.

14. The system of claim 9, wherein the instructions cause the system to determine the link quality by:
 determining a first TX count and a first RX count between the previous marker ID and the current marker ID, the first TX count and the first RX count being counted by the first internetworking device;
 determining, from the marker-reply packet, a second TX count and a second RX count between the previous marker ID and the current marker ID, the second TX count and the second RX count being counted by the second internetworking device;

wherein the instructions to cause the system to determine the packet losses further cause the system to:
  determine a first packet loss in a direction from the first internetworking device to the second internetworking device based on a difference between the first TX count and the second RX count; and
  determine a second packet loss in a direction from the second internetworking device to the first internetworking device based on a difference between the second TX count and the first RX count.

15. The system of claim 9, wherein the instructions when executed cause the system to also:
  determine that the link quality is below a threshold; and
  generate an alert indicating the link quality is below a threshold.

16. The system of claim 9, wherein the instructions when executed cause the system to also:
  generate a report including data describing the link quality; and
  send the report to the second internetworking device.

17. A method comprising:
  generating, by a first internetworking device, a first packet comprising statistics transmitted by either the first internetworking device or a second internetworking device to the other of the second internetworking device or the first internetworking device;
  generating, by the second internetworking device, a second packet comprising statistics transmitted by either the first internetworking device or the second internetworking device to the other of the second internetworking device or the first internetworking device; and
  determining, at the first internetworking device, a link quality between the first internetworking device and the second internetworking device,
  wherein determining the link quality comprises determining transmission counts and receiving counts associated with the first and second packets, determining a first packet loss and a second packet loss based on the transmission counts and the receiving counts, applying a weight to the first packet loss and the second packet loss based on at least one network factor that affects the link quality, and determining the link quality based on the weighted packet losses.

18. The method of claim 17, wherein the first internetworking device is an access point or a controller and the second internetworking device is an access point or a controller.

* * * * *